US012725418B2

(12) United States Patent
Hagihara et al.

(10) Patent No.: US 12,725,418 B2
(45) Date of Patent: Sep. 1, 2026

(54) MONITORING DEVICE OF ANALYZER

(71) Applicant: SHIMADZU CORPORATION, Kyoto (JP)

(72) Inventors: Daisuke Hagihara, Kyoto (JP); Taiki Nishimura, Kyoto (JP); Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 395 days.

(21) Appl. No.: 17/943,204

(22) Filed: Sep. 13, 2022

(65) Prior Publication Data

US 2023/0092297 A1 Mar. 23, 2023

(30) Foreign Application Priority Data

Sep. 15, 2021 (JP) ................................ 2021-149853
Jun. 22, 2022 (JP) ................................ 2022-100349

(51) Int. Cl.

| | |
|---|---|
| ***G06V 20/52*** | (2022.01) |
| ***G01N 3/06*** | (2006.01) |
| ***G01N 3/10*** | (2006.01) |
| ***G06T 5/80*** | (2024.01) |
| ***G06T 7/11*** | (2017.01) |

(Continued)

(52) U.S. Cl.
CPC ............... *G06V 20/52* (2022.01); *G01N 3/06* (2013.01); *G01N 3/10* (2013.01); *G06T 5/80* (2024.01); *G06T 7/11* (2017.01); *G06T 7/60* (2013.01); *G06V 30/1448* (2022.01); *G06V 30/19* (2022.01); *A01K 1/01* (2013.01); *G01N 2203/0019* (2013.01); *G01N 2203/0048* (2013.01); *G06K 7/1413* (2013.01);
(Continued)

(58) Field of Classification Search
CPC .... G06V 2201/02; G06V 20/52; G06V 30/19; G01N 3/10; G01N 2203/0019; G01N 2203/0048; G01N 2203/0073; G06T 7/0004; G06T 2207/30108; G06T 7/11
See application file for complete search history.

(56) References Cited

U.S. PATENT DOCUMENTS 5,887,086 A * 3/1999 Tokano ................ G06V 30/142
382/312
10,445,202 B2 10/2019 Frenz
(Continued)

FOREIGN PATENT DOCUMENTS

JP 2002056387 2/2002
JP 2006292400 10/2006
(Continued)

OTHER PUBLICATIONS

SOLE Fitness, Youtube https://www.youtube.com/watch?v=frWf7_hdwmY (Year: 2017).*
(Continued)

*Primary Examiner* — Sumati Lefkowitz
*Assistant Examiner* — Wayne Zhang
(74) *Attorney, Agent, or Firm* — JCIPRNET

(57) ABSTRACT

A monitoring device includes an acquisition unit configured to acquire a captured image of a display panel of a control device configured to control an analyzer, an image storage unit configured to store the captured image, and a state determination unit configured to determine a state of the analyzer based on the captured image.

12 Claims, 28 Drawing Sheets

(51) Int. Cl.

| | |
|---|---|
| ***G06T 7/60*** | (2017.01) |
| ***G06V 30/14*** | (2022.01) |
| ***G06V 30/19*** | (2022.01) |
| *A01K 1/01* | (2006.01) |
| *G06K 7/14* | (2006.01) |

(52) U.S. Cl.
CPC .. *G06K 7/1443* (2013.01); *G06T 2207/30204* (2013.01); *G06V 2201/02* (2022.01)

(56) References Cited

U.S. PATENT DOCUMENTS

| | | | | |
|---|---|---|---|---|
| 11,017,321 | B1 * | 5/2021 | Mishra | G06N 20/20 |
| 2006/0210192 | A1 * | 9/2006 | Orhun | G06V 10/24 382/275 |
| 2012/0218188 | A1 * | 8/2012 | Kashitani | G07F 19/2055 345/168 |
| 2013/0278724 | A1 * | 10/2013 | Namgoong | G06F 21/31 348/46 |
| 2014/0232882 | A1 * | 8/2014 | Yamada | G06T 1/00 348/207.1 |
| 2015/0095717 | A1 | 4/2015 | Frenz et al. | |
| 2018/0121744 | A1 * | 5/2018 | Kim | G06V 10/993 |
| 2018/0143795 | A1 * | 5/2018 | Masuzawa | G06F 3/1204 |
| 2018/0271465 | A1 * | 9/2018 | Proksa | G16H 50/30 |
| 2019/0332514 | A1 | 10/2019 | Frenz et al. | |
| 2019/0378261 | A1 * | 12/2019 | Schultz | G06T 7/254 |
| 2020/0272824 | A1 | 8/2020 | Hiramatsu | |
| 2021/0279637 | A1 * | 9/2021 | Inoue | G06N 20/00 |

FOREIGN PATENT DOCUMENTS

| | | |
|---|---|---|
| JP | 2008035110 | 2/2008 |
| JP | 2015200973 | 11/2015 |
| JP | 2019164449 | 9/2019 |
| JP | 6672141 | 3/2020 |
| JP | 2020135588 | 8/2020 |
| WO | 2015048751 | 4/2015 |

OTHER PUBLICATIONS

"LTM electro-dynamic testing machine—Elektro-dynamische Prüfmaschine"; ZwickRoellTV https://www.youtube.com/watch?v=Ex4HdywH8KU&list=PLVq901XIL48rA5ltwehaiiYr_vTGzpO3c&index=25 (Year: 2017).*

"Office Action of China Counterpart Application", issued on Aug. 12, 2025, with English translation thereof, p. 1-p. 22.

"Office Action of China Counterpart Application", issued on Mar. 10, 2026, with English translation thereof, p. 1-p. 9.

"Notice of Reasons for Refusal of Japan Counterpart Application", issued on Feb. 3, 2026, with English translation thereof, p. 1-p. 8.

* cited by examiner 40
41
414
415
EMERGENCY
51
51a
51b
51c
51d
511
512
513
514
54
541
542
RUN
STOP
MANI FOLD
LOAD
POWER UNIT
CLEAR
CANCEL
−
7
8
9
4
5
6
1
2
3
0
.
ENTER
52
52a
52b
521
522
55
551
552
START
STOP
ENABLE
FAST
PROTECT
413
412
50
53
501
502
503
531
532
533
534
4, 291, 095
TEST FORCE
50. 1215 kN
PISTON DISPLACEMENT
16. 6601 mm
AUX
−0. 0011 v
SET SIGNAL
−7. 7569 mm
DISPLAY CH
AVERAGE MOVEMENT
GAIN
11:58
TESTING
REMAINING TIME 115d 16h 35m
MONITOR
CONDITION
FILE
SET UP
410
411

FIG.9

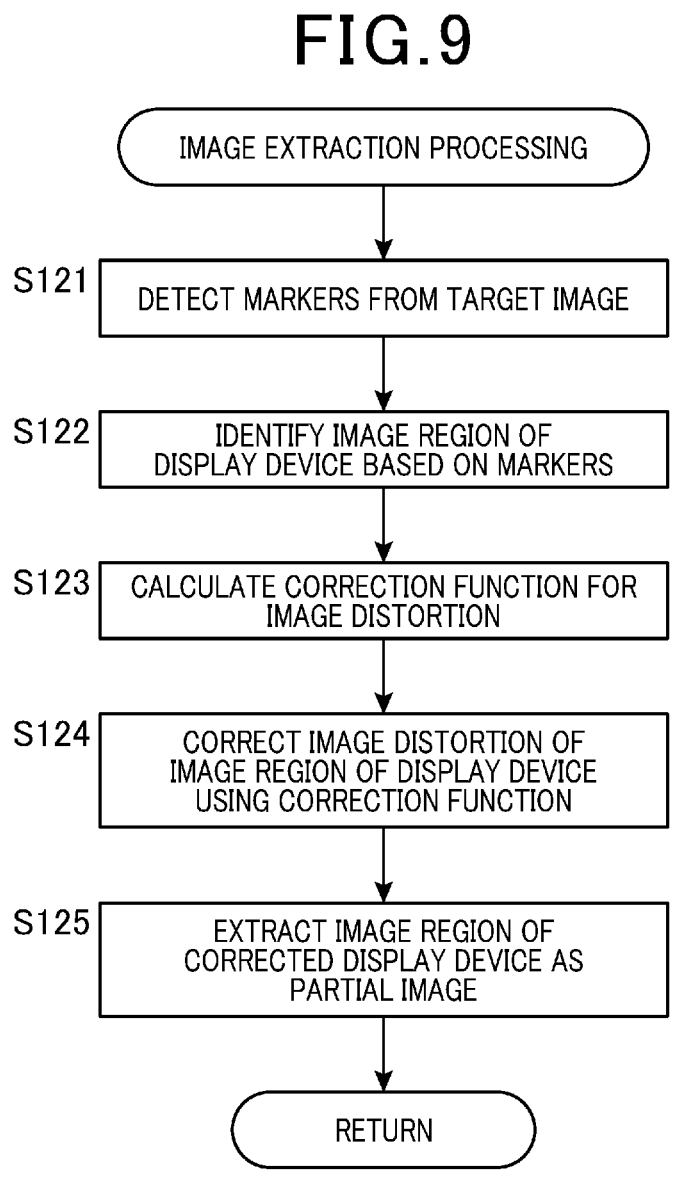

IMAGE EXTRACTION PROCESSING

S121 DETECT MARKERS FROM TARGET IMAGE

S122 IDENTIFY IMAGE REGION OF DISPLAY DEVICE BASED ON MARKERS

S123 CALCULATE CORRECTION FUNCTION FOR IMAGE DISTORTION

S124 CORRECT IMAGE DISTORTION OF IMAGE REGION OF DISPLAY DEVICE USING CORRECTION FUNCTION

S125 EXTRACT IMAGE REGION OF CORRECTED DISPLAY DEVICE AS PARTIAL IMAGE

RETURN

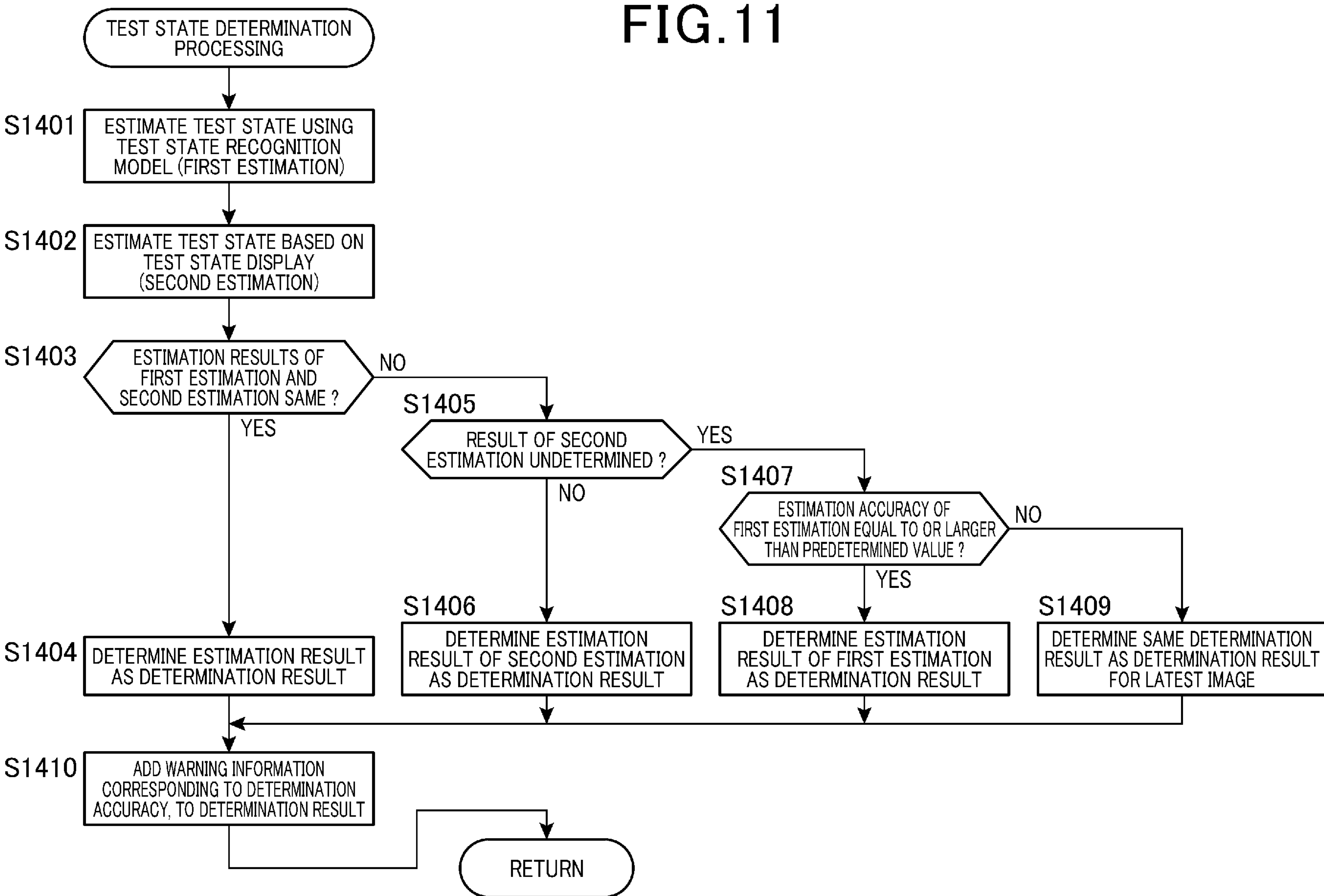
FIG.11
TEST STATE DETERMINATION PROCESSING
S1401
ESTIMATE TEST STATE USING TEST STATE RECOGNITION MODEL (FIRST ESTIMATION)
S1402
ESTIMATE TEST STATE BASED ON TEST STATE DISPLAY (SECOND ESTIMATION)
S1403
ESTIMATION RESULTS OF FIRST ESTIMATION AND SECOND ESTIMATION SAME ?
NO
YES
S1405
RESULT OF SECOND ESTIMATION UNDETERMINED ?
YES
NO
S1407
ESTIMATION ACCURACY OF FIRST ESTIMATION EQUAL TO OR LARGER THAN PREDETERMINED VALUE ?
NO
YES
S1404
DETERMINE ESTIMATION RESULT AS DETERMINATION RESULT
S1406
DETERMINE ESTIMATION RESULT OF SECOND ESTIMATION AS DETERMINATION RESULT
S1408
DETERMINE ESTIMATION RESULT OF FIRST ESTIMATION AS DETERMINATION RESULT
S1409
DETERMINE SAME DETERMINATION RESULT AS DETERMINATION RESULT FOR LATEST IMAGE
S1410
ADD WARNING INFORMATION CORRESPONDING TO DETERMINATION ACCURACY, TO DETERMINATION RESULT
RETURN

Figure 20:
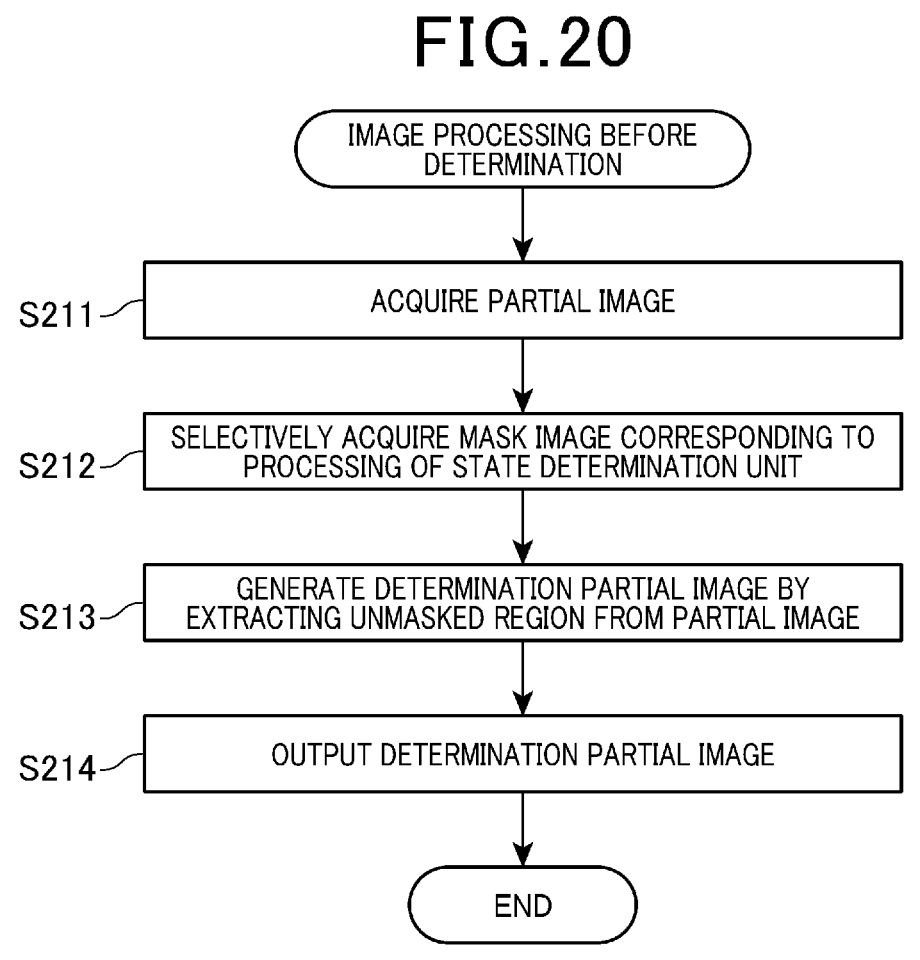

IMAGE PROCESSING BEFORE DETERMINATION

S211 ACQUIRE PARTIAL IMAGE

S212 SELECTIVELY ACQUIRE MASK IMAGE CORRESPONDING TO PROCESSING OF STATE DETERMINATION UNIT

S213 GENERATE DETERMINATION PARTIAL IMAGE BY EXTRACTING UNMASKED REGION FROM PARTIAL IMAGE

S214 OUTPUT DETERMINATION PARTIAL IMAGE

END

MONITORING DEVICE OF ANALYZER

INCORPORATION BY REFERENCE

The present application claims priority under 35 U.S.C. § 119 to Japanese Patent Application No. 2021-149853 filed on Sep. 15, 2021 and Japanese Patent Application No. 2022-100349 filed on Jun. 22, 2022. The content of the applications is incorporated herein by reference in its entirety.

BACKGROUND

Technical Field

The present invention relates to a monitoring device of an analyzer.

Related Art

Conventionally, an operating state of an analyzer has been managed by a user of the analyzer. For example, a fatigue tester described in JP 2006-292400 A includes a control device that controls a test and includes a display device. The control device displays a test condition and the like on the display device. By viewing the display on the display device, a user recognizes and manages an operating state of the fatigue tester.

SUMMARY

In the above-described conventional configuration, the user needs to go to a location where the control device is installed, for checking the operating state of the fatigue tester. An image or a video of a display panel of the control device can be transmitted to a device installed in a remote location, and can be stored into a storage device in such a manner that a change or the like of a state in the fatigue tester can be recognized in a remote location or after a fatigue test. Nevertheless, in this method, the user needs to visually determine a state of a material testing machine or recognize a changing point or the like thereof from an enormous number of images or videos showing the display panel, which is not easy.

In addition, there has been recently an increasing number of users who own a plurality of analyzers not limited to a material testing machine such as a fatigue tester. The plurality of analyzers sometimes includes an analyzer including a control device that cannot be connected to a communication network. In addition, analyzers manufactured by different manufacturers mixedly exist in some cases. In these cases, even if a communication network can be used, an analysis result sometimes fails to be collected and analyzed using the communication network. For example, in a case where a control application to be used for the control of an analyzer is limited to a single control application, even if a communication network exists, an analysis result cannot be collected and analyzed.

The present invention has been devised in view of such a situation, and aims to enable a user to easily recognize the state of an analyzer.

A monitoring device according to an aspect of the present invention includes an acquisition unit configured to acquire a captured image of a display panel of a control device configured to control an analyzer, an image storage unit configured to store the captured image, and a state determination unit configured to determine a state of the analyzer based on the captured image.

According to the aspect of the present invention, the state of an analyzer is determined based on a captured image of a display panel of a control device that controls the analyzer. Thus, the user can easily recognize the state of the analyzer. In addition, because the state of the analyzer is determined based on a captured image of the display panel of the control device, the control device itself needs not be connected to a communication network, or include a communication function. In addition, even in a case where control devices manufactured by different manufacturers are included in a state determination target, by a state determination unit determining information displayed on the display panel, control information and analysis information can be extracted and analyzed using a common application.

BRIEF DESCRIPTION OF DRAWINGS

FIG. 9 is a flowchart illustrating an example of a procedure of image extraction processing in FIG. 8;

FIG. 11 is a flowchart illustrating an example of a procedure of test state determination processing in FIG. 8;

FIG. 18 is a flowchart illustrating an example of mask image generation processing;

FIG. 20 is a flowchart illustrating an example of image processing before determination;

DETAILED DESCRIPTION

Hereinafter, embodiments of the present invention will be described with reference to the drawings.

1. First Embodiment

1.1. Utilization Form of Monitoring Device

Hereinafter, a material testing machine will be used as an example of an analyzer. Nevertheless, the invention of this application is not limited to a material testing machine, and is an invention generally applied to an analyzer. Examples of analyzers include a chromatogram device, a mass spectroscope, an optical analyzer, an electronic scale, and the like, but other devices may be used.

Figure 1:
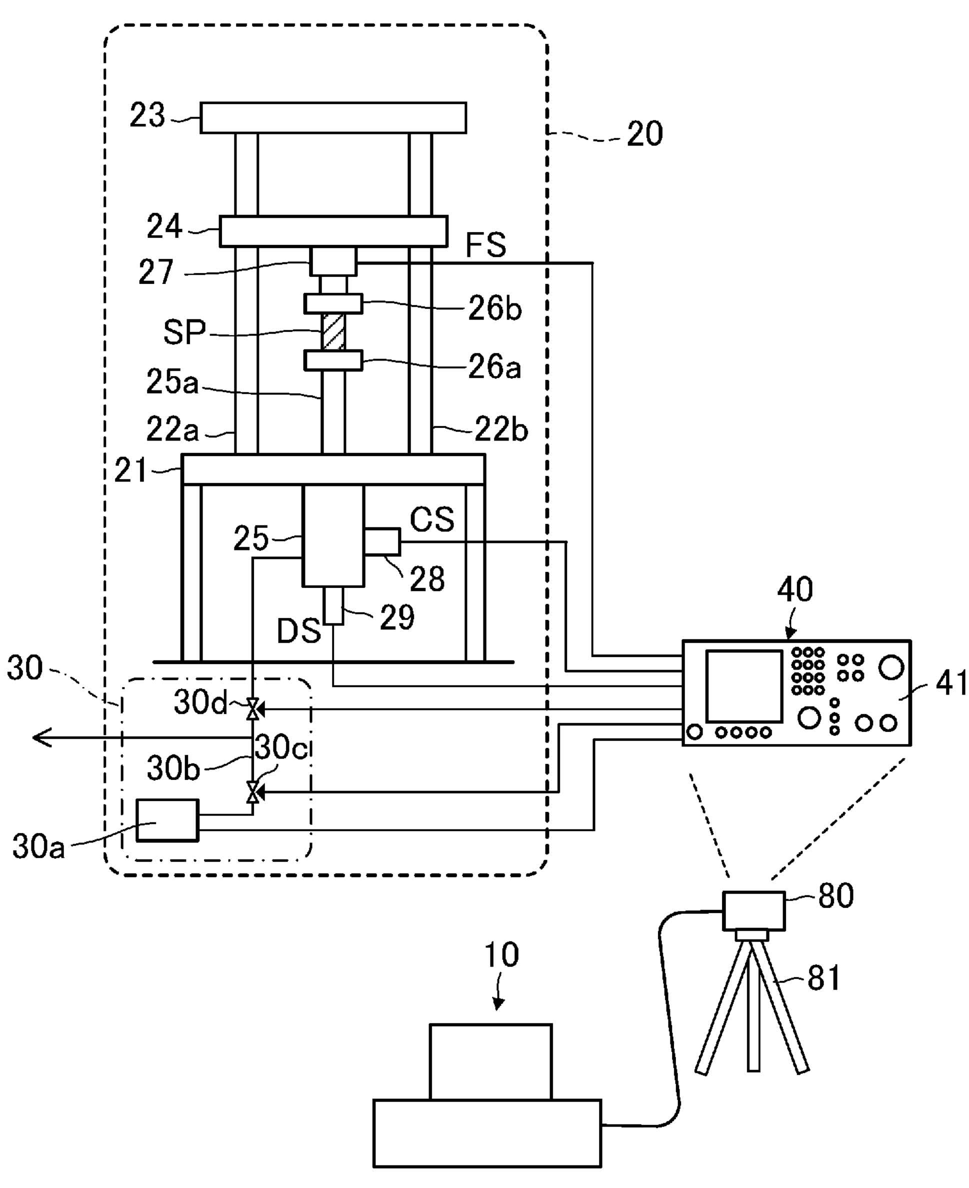
FIG. 1 is a diagram illustrating an example of a utilization form of a monitoring device that monitors a state of a material testing machine according to an embodiment of the present invention.

FIG. 1 is a diagram illustrating an example of a utilization form of a monitoring device 10. The monitoring device 10 is connected with a camera 80. The camera 80 captures an image of a display panel 41 of a control device 40. The control device 40 controls a material testing machine 20.

The material testing machine 20 is a fatigue tester, for example, and forms, on a base 21, a load frame by a pair of support columns 22*a* and 22*b*, and a yoke 23, and a crosshead 24 is fixed to the support columns 22*a* and 22*b*.

A hydraulic actuator 25 is arranged on the base 21, and a lower jig 26*a* that fixes a lower end of a test piece SP is attached to a piston rod 25*a* of the hydraulic actuator 25. In addition, an upper jig 26*b* that fixes an upper end of the test piece SP is attached to the crosshead 24 via a load cell 27. The lower jig 26*a* and the upper jig 26*b* each include a chuck mechanism for holding the test piece SP.

The load cell 27 detects test force acting on the test piece SP.

The hydraulic actuator 25 is controlled in its direction and amount by a servo valve 28 so that the piston rod 25*a* expands and contracts. Test force is consequently applied to the test piece SP fixed between the upper jig 26*b* and the lower jig 26*a*. The stroke of the hydraulic actuator 25 (i.e., displacement of the test piece SP) is detected by an operating transformer 29 attached to the hydraulic actuator 25.

The material testing machine 20 is provided with a hydraulic pressure source 30. The hydraulic pressure source 30 supplies the hydraulic actuator 25 with hydraulic pressure, and drives the hydraulic actuator 25. More specifically, the hydraulic actuator 25 is driven by hydraulic pressure supplied from the hydraulic pressure source 30, and hydraulic pressure is adjusted by the servo valve 28, whereby the piston rod 25*a* is expanded and contracted. The hydraulic pressure source 30 includes a hydraulic pump 30*a*, a manifold 30*b*, a piping valve 30*c*, and a load valve 30*d*. The manifold 30*b* supplies hydraulic pressure generated by the hydraulic pump 30*a*, to the material testing machine 20, and can also supply the hydraulic pressure to another device (for example, another material testing machine).

The piping valve 30*c* and the load valve 30*d* open and close based on an instruction from the control device 40. By the piping valve 30*c* opening, hydraulic pressure generated by the hydraulic pump 30*a* is introduced to the manifold 30*b*. In addition, by the load valve 30*d* opening, hydraulic pressure inside the manifold 30*b* is introduced to the hydraulic actuator 25. By both of the piping valve 30*c* and the load valve 30*d* opening, hydraulic pressure generated by the hydraulic pump 30*a* becomes ready to be introduced to the hydraulic actuator 25 via the servo valve 28.

The control device 40 generates test force information by acquiring a test force signal FS output from the load cell 27, and performing analog-to-digital (A/D) conversion of the test force signal FS. The control device 40 generates displacement information by acquiring a displacement signal DS output from the operating transformer 29, and performing A/D conversion of the displacement signal DS. The control device 40 generates command information based on the test force information and the displacement information. The control device 40 generates a command signal CS by performing digital-to-analog (D/A) conversion of the command information, and outputs the generated the command signal CS to the servo valve 28.

The servo valve 28 controls a pressure oil direction and a pressure oil amount of the hydraulic actuator 25 in accordance with the command signal CS output from the control device 40. Note that amplifiers that respectively amplify the test force signal FS, the displacement signal DS, and the command signal CS may be arranged between the material testing machine 20 and the control device 40.

The material testing machine 20 is controlled by the control device 40, and performs a fatigue test of the test piece SP, for example. In the fatigue test, the material testing machine 20 repeatedly applies tensile stress σ to the test piece SP. The tensile stress σ and an upper limit number of times of repetitive application are preset. The above-described upper limit number of times is $10^2$ times to $10^8$ times, for example.

The camera 80 is fixed to a tripod 81, for example, and is arranged at a position where an image of the entire display panel 41 of the control device 40 can be captured. The monitoring device 10 acquires a captured image of the display panel 41 of the control device 40 at a predetermined time interval using the camera 80. Based on the acquired captured image, the monitoring device 10 digitizes the display on a display device provided on the display panel 41 of the control device 40.

The "digitization" will be further described with reference to FIG. 5.

1.2. Display Panel Configuration of Control Device

Figure 2:
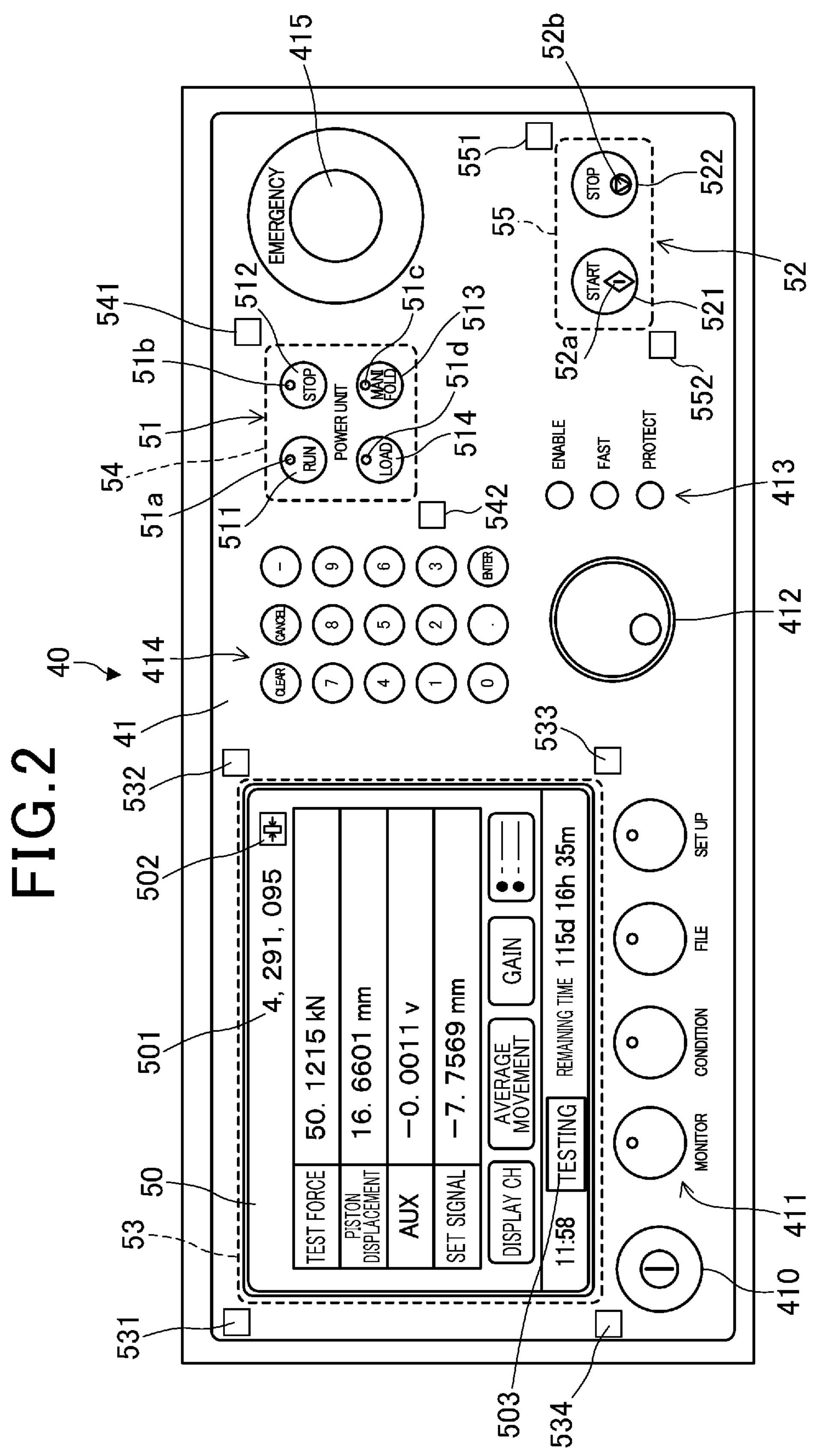
FIG. 2 is a diagram illustrating an example of a configuration of a display panel of a control device that controls the material testing machine.

FIG. 2 is a diagram illustrating an example of a configuration of the display panel 41 of the control device 40.

On the display panel 41, a power switch 410, a function key 411, and a dial 412 are arranged. The power switch 410 is used for turning on and off the power of the control device 40. The function key 411 is used for issuing an execution instruction of a specific function to the control device 40. The dial 412 is used for an operation such as a change of a setting value.

In addition, a setting key 413, a numerical keypad 414, and an emergency stop switch 415 are arranged on the display panel 41. The setting key 413 is used for setting an operation of the control device 40. The numerical keypad 414 is used in inputting numerical values. The emergency stop switch 415 is used for causing an emergency stop of the material testing machine 20.

In addition, a display 50, a power unit operation key 51, and a test operation key 52 are arranged on the display panel 41. The power unit operation key 51 is used in operating the hydraulic pressure source 30 of the material testing machine 20. The test operation key 52 is used for issuing start and stop instructions of a test in the material testing machine 20.

The display 50 is a touch panel including a display screen formed by a liquid crystal display (LCD), for example, and a touch sensor arranged on the display screen.

Various types of information regarding operations of the material testing machine 20, such as test force in a fatigue test being executed by the material testing machine 20, a piston displacement, and a remaining time before a fatigue test end are displayed on the display 50. In the first embodiment and each embodiment to be described below, in particular, a number of cycles display unit 501 and a specific symbol display unit 502 are provided on the display screen of the display 50. The number of cycles display unit 501 displays the number of cycles of stress application in a fatigue test. The specific symbol display unit 502 displays a predetermined specific symbol (for example, icon).

In addition, a test state display unit 503 is provided on the display screen of the display 50. The test state display unit 503 displays whether or not a test is being executed in the material testing machine 20. In the test state display unit 503, for example, characters indicating "testing" or "under suspension" are displayed with being overlaid on a predetermined background color. In the first embodiment and each embodiment to be described below, for example, when a test is being executed, characters indicating "testing" are displayed in the test state display unit 503 with being overlaid on a green background, and when a test is suspended, characters indicating "under suspension" are displayed with being overlaid on a red background.

The power unit operation key 51 includes a run button 511, a stop button 512, a manifold button 513, and a load application button 514. The run button 511 and the stop button 512 are respectively used for running and stopping the hydraulic pump 30*a*. The manifold button 513 is used for opening/closing the piping valve 30*c*. In addition, the load application button 514 is used for opening/closing the load valve 30*d*. The run button 511, the stop button 512, the manifold button 513, and the load application button 514 respectively include a display lamp 51*a*, a display lamp 51*b*, a display lamp 51*c*, and a display lamp 51*d*.

The test operation key 52 includes a start key 521 and a stop key 522. The start key 521 and the stop key 522 respectively include a display lamp 52*a* and a display lamp 52*b*. If the user presses the start key 521, the material testing machine 20 starts a fatigue test, and characters indicating "testing" are displayed in the test state display unit 503 of the display 50. In addition, if the user presses the stop key 522, the material testing machine 20 stops an ongoing test operation, and characters indicating "under suspension" are displayed in the test state display unit 503 of the display 50.

Here, the display 50, the display lamps 51*a*, 51*b*, 51*c*, and 51*d* included in the power unit operation key 51, and the display lamps 52*a* and 52*b* included in the test operation key 52 correspond to an example of a display device included in the display panel 41. The display 50 also corresponds to an example of a numerical display device that displays specific symbols and numerical values.

In the display panel 41, markers including barcodes allocated for indicating an identification code of each display device region are arranged at at least two corners of each display device region being a region in which a display device is provided. At least one of the display device regions is rectangular. For at least one rectangular display device region, markers are provided at four corners of the display device region. As described below, based on the markers provided at four corners of a rectangular display device region, image distortion in a captured image of the display panel 41 is corrected.

In the example illustrated in FIG. 2, four markers 531, 532, 533, and 534 are respectively arranged at four corners of a rectangular display device region 53 in which the display 50 serving as a numerical display device is provided. In addition, a marker 541 and a marker 542 are respectively arranged at two corners of a rectangular display device region 54 in which the power unit operation key 51 is provided. Furthermore, a marker 551 and a marker 552 are respectively arranged at two corners of a rectangular display device region 55 in which the test operation key 52 is provided. These markers may be labels attached to the display panel 41 precedential to image capturing to be performed by the camera 80, or may be preliminarily printed on the display panel 41.

A barcode indicating an identification code of a corresponding display device region is allocated to each marker. A barcode includes information indicating a position in a corresponding display device region at which a marker including the allocated barcode is arranged. For example, barcode includes information such as "upper left", "upper right", "lower right", or "lower left" of the display device region.

For example, barcodes allocated to the markers 531, 532, 533, and 534 each include an identification code of the display device region 53 in which the display 50 is provided, and information indicating a corresponding position in the display device region 53. In addition, barcodes allocated to the markers 541 and 542 each include an identification code of the display device region 54 in which the power unit operation key 51 is provided, and information indicating a corresponding position in the display device region 54. Similarly, barcodes allocated to the markers 551 and 552 each include an identification code of the display device region 55 in which the test operation key 52 is provided, and information indicating a corresponding position in the display device region 54.

The display lamps 51*a*, 51*b*, 51*c*, 51*d*, 52*a*, and 52*b* are light emitting diodes (LEDs), for example. These display lamps may each include one (single) lighting color, or may be enabled to selectively light in two or more lighting colors.

By a combination of these lighting modes, the display lamps 51*a*, 51*b*, 51*c*, and 51*d* display a hydraulic pressure source state in the material testing machine 20, that is, a state of an operation of the hydraulic pressure source 30. In addition, by a combination of these lighting modes, the display lamps 52*a* and 52*b* display an execution state of a test operation in the material testing machine 20, that is, display whether a test is ongoing or suspended.

Here, the "lighting mode" includes a lighting or extinction state of each lamp, and a lighting color or a luminance in a lighting state. In the first embodiment and each embodiment to be described below, the display lamps 51*a*, 51*b*, 51*c*, 51*d*, 52*a*, and 52*b* are single-color LEDs, and a lighting mode refers to a combination of lighting and extinction of the display lamps.

FIGS. 3A, 3B, 3C, 3D, 3E, and 3F are diagrams each illustrating an example of a combination of lighting modes of the display lamps 51*a*, 51*b*, 51*c*, and 51*d* includes in the power unit operation key 51, and a hydraulic pressure source state of the material testing machine 20. In FIGS. 3A, 3B, 3C, 3D, 3E, and 3F, lighting states of the display lamp 51*a*, 51*b*, 51*c*, and 51*d* are indicated in black color and extinction states thereof are indicated in white color.

Figure 3A:
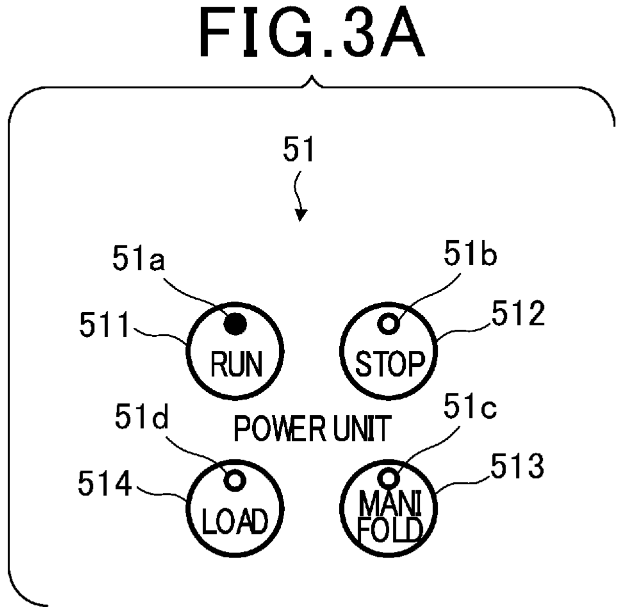
FIG. 3A is a diagram illustrating an example of a relationship between lighting modes of four display lamps provided on a power unit operation key of the control device, and a hydraulic pressure source state of the material testing machine.

FIG. 3A illustrates that, by the display lamp 51*a* lighting up and the other display lamps 51*b*, 51*c*, and 51*d* going out, a hydraulic pressure source state of the material testing machine 20 is in a RUN state (i.e., state in which the hydraulic pump 30*a* is activated).

Figure 3B:
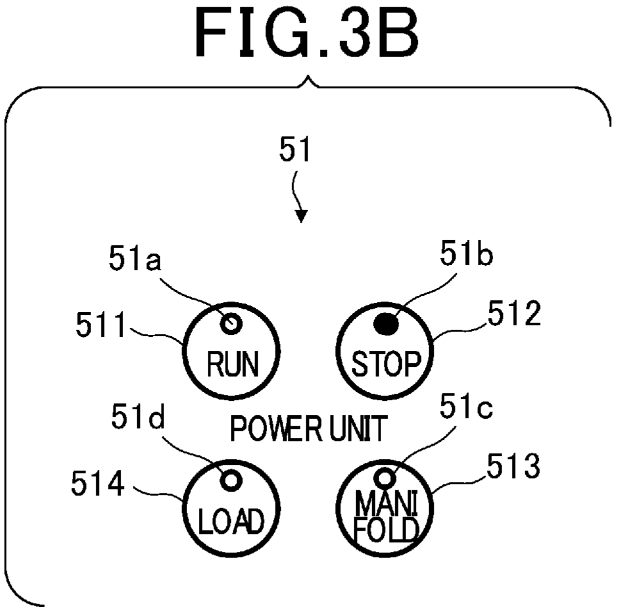
FIG. 3B is a diagram illustrating an example of a relationship between lighting modes of four display lamps provided on a power unit operation key of the control device, and a hydraulic pressure source state of the material testing machine.

FIG. 3B illustrates that, by the display lamp 51*b* lighting up and the other display lamps 51*a*, 51*c*, and 51*d* going out, a hydraulic pressure source state of the material testing machine 20 is in a STOP state (i.e., state in which the hydraulic pump 30*a* is stopped).

Figure 3C:
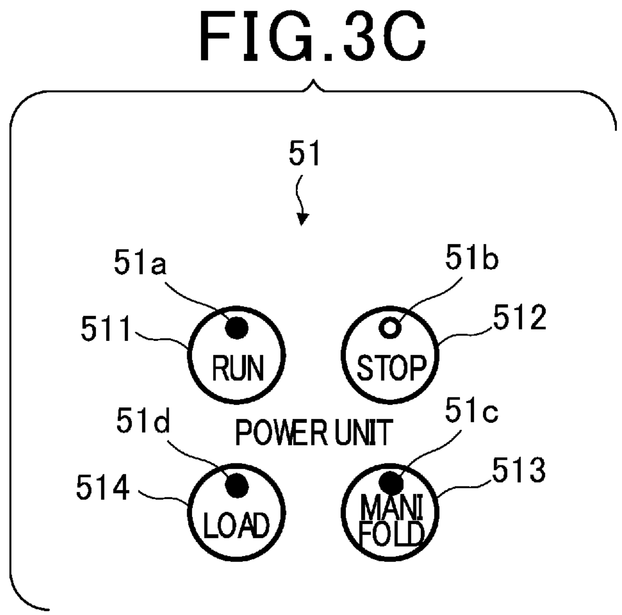
FIG. 3C is a diagram illustrating an example of a relationship between lighting modes of four display lamps provided on a power unit operation key of the control device, and a hydraulic pressure source state of the material testing machine.

FIG. 3C illustrates that, by the display lamps 51*a*, 51*c*, and 51*d* lighting up and the display lamp 51*b* going out, a hydraulic pressure source state of the material testing machine 20 is in a LOAD_MANI state (i.e., state in which the piping valve 30*c* is opened).

Figure 3D:
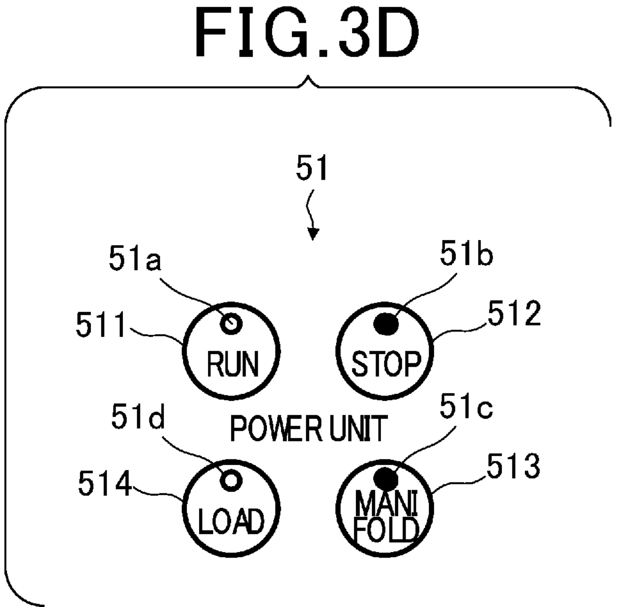
FIG. 3D is a diagram illustrating an example of a relationship between lighting modes of four display lamps provided on a power unit operation key of the control device, and a hydraulic pressure source state of the material testing machine.

FIG. 3D illustrates that, by the display lamps 51*b* and 51*c* lighting up and the display lamps 51*a* and 51*d* going out, a hydraulic pressure source state of the material testing machine 20 is in a STOP_MANI state (i.e., state in which the piping valve 30*c* is closed).

Figure 3E:
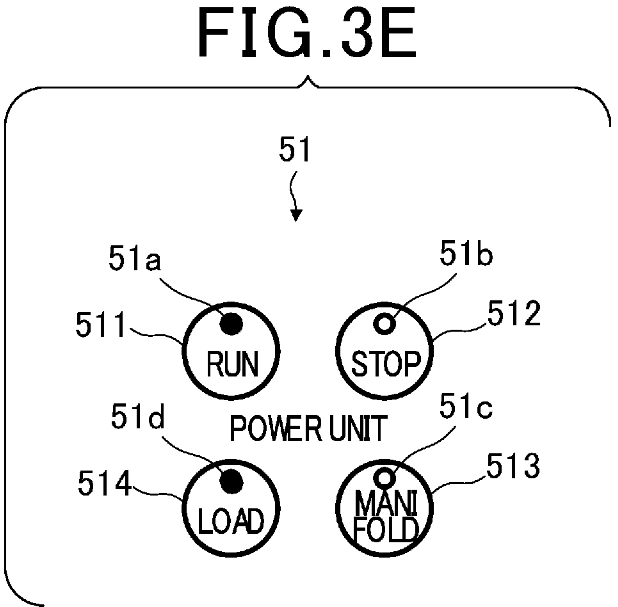
FIG. 3E is a diagram illustrating an example of a relationship between lighting modes of four display lamps provided on a power unit operation key of the control device, and a hydraulic pressure source state of the material testing machine.

FIG. 3E illustrates that, by the display lamps 51*a* and 51*d* lighting up and the display lamps 51*b* and 51*c* going out, a hydraulic pressure source state of the material testing machine 20 is in a LOAD state (i.e., state in which both the piping valve 30*c* and the load valve 30*d* are opened).

Figure 3F:
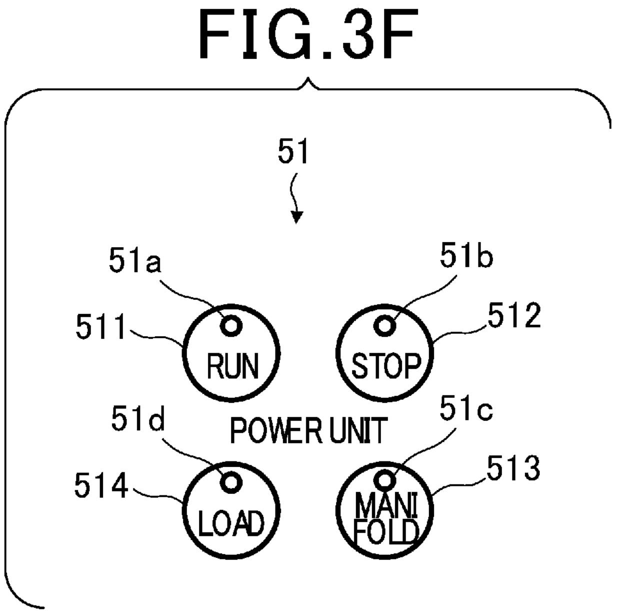
FIG. 3F is a diagram illustrating an example of a relationship between lighting modes of four display lamps provided on a power unit operation key of the control device, and a hydraulic pressure source state of the material testing machine.

In addition, FIG. 3F illustrates that, by all of the display lamps 51*a*, 51*b*, 51*c*, and 51*d* going out, a hydraulic pressure source state of the material testing machine 20 is a POWER OFF state (i.e., state in which powers for operations of the hydraulic pump 30*a*, the piping valve 30*c*, and the load valve 30*d* are turned off).

Figure 4A:
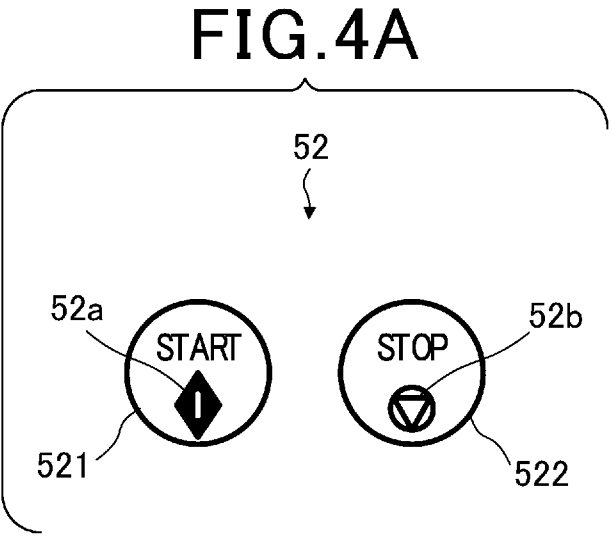
FIG. 4A is a diagram illustrating an example of a relationship between lighting modes of two display lamps provided on a test operation key of the control device, and a test state of the material testing machine.
Figure 4B:
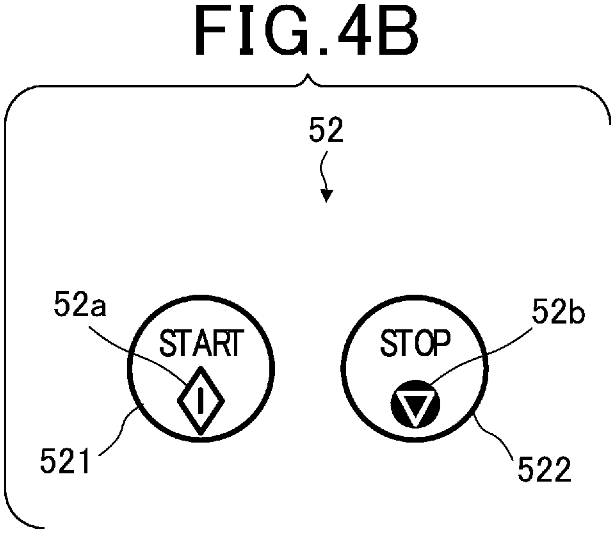
FIG. 4B is a diagram illustrating an example of a relationship between lighting modes of two display lamps provided on a test operation key of the control device, and a test state of the material testing machine.

FIGS. 4A and 4B are diagrams each illustrating an example of a relationship between a combination of lighting states of the display lamps 52*a* and 52*b* of the test operation key 52, and a test state of the material testing machine 20. FIG. 4A illustrates that, by the display lamp 52*a* lighting up and the display lamp 52*b* going out, the material testing machine 20 is in a START state (i.e., a state in which a fatigue test is ongoing).

In addition, FIG. 4B illustrates that, by the display lamp 52*b* lighting up and the display lamp 52*a* going out, the material testing machine 20 is in a STOP state (i.e., a state in which a fatigue test is suspended).

1.3. Configuration of Monitoring Device

Figure 5:
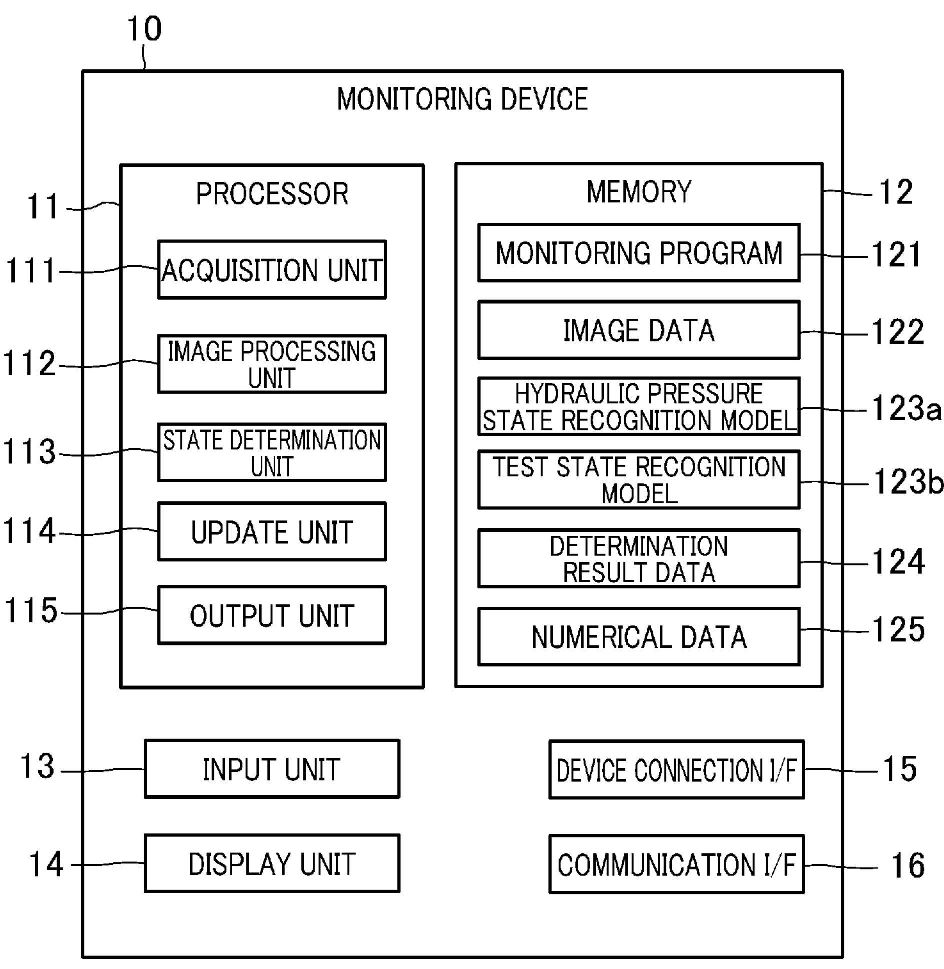
FIG. 5 is a diagram illustrating an example of a configuration of a monitoring device.

FIG. 5 is a diagram illustrating an example of a configuration of the monitoring device 10. The monitoring device 10 can be formed by a personal computer, for example, but is not limited to this, and may be formed by one or a plurality of appropriate electronic circuits. Such an electronic circuit can include programmed hardware such as a digital signal processor (DSP), a field programmable gate array (FPGA), and a SYSTEM-ON-A-CHIP (SoC)-FPGA.

The monitoring device 10 includes a processor 11, a memory 12, an input unit 13, a display unit 14, a device connection interface (device connection I/F) 15, and a communication interface (communication I/F) 16.

The processor 11 includes a central processing unit (CPU), a micro-processing unit (MPU), and the like.

The memory 12 includes a read only memory (ROM), a random access memory (RAM), and the like. The memory 12 may include a storage device such as a hard disk drive (HDD) and a solid state drive (SSD). The memory 12 stores a monitoring program 121 to be executed by the processor 11, image data 122, a hydraulic pressure state recognition model 123*a*, a test state recognition model 123*b*, a determination result data 124, and numerical data 125. The memory 12 corresponds to an example of an image storage unit.

The input unit 13 is an input device to be used when the user enters data and commands to the monitoring device 10, and includes a keyboard, a switch and a pointing device such as a mouse, for example. The display unit 14 is a display that displays characters, figures, images, and the like, and includes an LCD or the like, for example. The input unit 13 and the display unit 14 may be formed as a touch panel in which a touch sensor is arranged on a display screen such as an LCD, for example.

The device connection I/F 15 is an interface for connecting the monitoring device 10 with a peripheral device, and is a universal serial bus (USB) (registered trademark) transceiver that performs USB communication, for example. In the first embodiment, the monitoring device 10 is connected with the camera 80 via the device connection I/F 15.

The communication I/F 16 is a communication device (transmitter/receiver, circuit) for the monitoring device 10 performing wire communication or wireless communication for communicating with another device (for example, another computer device or server device) via a communication network such as the Internet or an intranet.

The processor 11 includes, as functional components or functional units, an acquisition unit 111, an image recognition unit 112, a state determination unit 113, an update unit 114, and an output unit 115. These functional components includes in the processor 11 are implemented by the processor 11 executing the monitoring program 121 stored in the memory 12, for example.

The acquisition unit 111 acquires a captured image obtained by capturing an image of the display panel 41 of the control device 40, from the camera 80 via the device connection I/F 15 at a predetermined time interval. In the first embodiment, a captured image to be acquired by the acquisition unit 111 is a captured image of the display panel 41 that is obtained when the material testing machine 20 is executing or suspending a fatigue test. Note that, in the first embodiment, the acquisition unit 111 acquires a captured image of the display panel 41 directly from the camera 80, but an acquisition source of the captured image is not limited to the camera 80. For example, the acquisition unit 111 may acquire captured images by sequentially reading out captured images preliminarily captured at a predetermined time interval and stored in the memory 12 or another device (for example, server device on a communication network). Hereinafter, a captured image acquired by the acquisition unit 111 at a specific timing will be referred to as a "target image", and is distinguished from captured images acquired before the specific timing. In the first embodiment, the acquisition unit 111 stores acquired captured images as part of the image data 122 in the memory 12.

The image recognition unit 112 performs image recognition processing on the target image acquired by the acquisition unit 111. By the image recognition processing, the image recognition unit 112 acquires, from images of the markers 531, 532, 533, 534, 541, 542, 551, and 552 on the display panel 41 that are included in the target image, identification codes indicated by the barcodes allocated to these markers. Then, based on the positions of these markers and the identification codes, the image recognition unit 112 identifies image regions on the target image that respectively correspond to the display device regions 53, 54, and 55 in which display devices are arranged.

With this configuration, even in a case where the position of the camera 80 shifts during a fatigue test of the material testing machine 20, an image region of each display device region on the target image can be appropriately identified. Such a positional shift of the camera 80 can occur in a case where the user moves the position of the camera 80 for performing an operation of the control device 40, for example.

In addition, based on positions on the target image of the markers 531, 532, 533, and 534 arranged at the four corners of the rectangular display device region 53, the image recognition unit 112 corrects image distortion of the above-described identified image regions on the target image that correspond to the display device regions 53, 54, and 55. With this configuration, for example, even in a case where a state of image distortion in a captured image changes during a fatigue test of the material testing machine 20, image distortion can be appropriately recognized from the arrangement of markers, and image correction can be promptly performed. Such a change in state of image distortion can occur in a case where the user moves the position of the camera 80 in an optical axis direction for performing an operation of the control device 40, for example.

Figure 6:
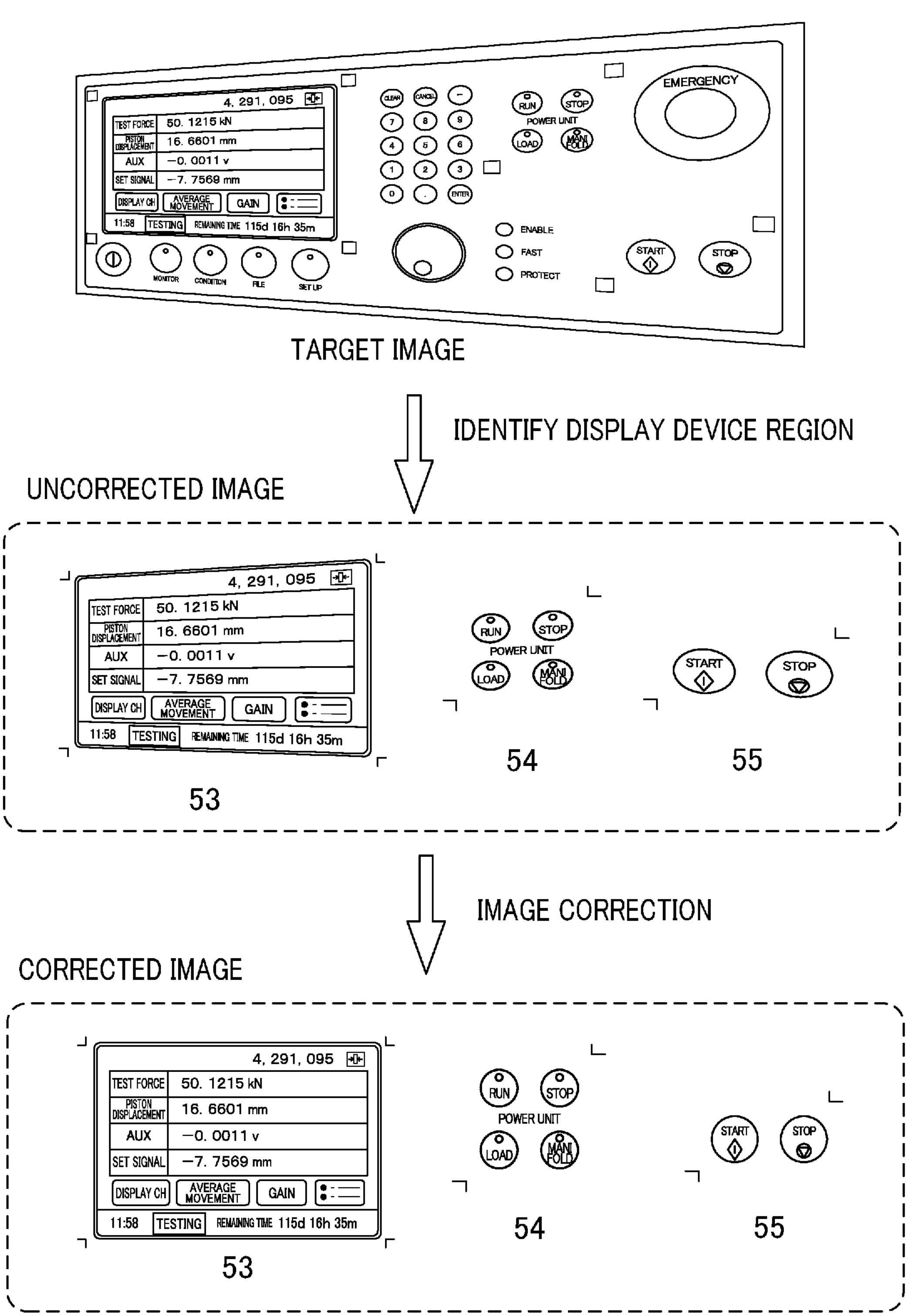
FIG. 6 is a diagram for describing an operation of an image recognition unit that acquires a partial image of a display device region from a target image.

FIG. 6 is a diagram for describing correction of image distortion that is to be performed by the image recognition unit 112. A diagram show in an upper part of FIG. 6 illustrates an example of a target image acquired by the acquisition unit 111 from the camera 80. In the example illustrated in FIG. 6, the target image is distorted in a trapezoidal shape. Such image distortion occurs due to a normal direction of the display panel 41 tilting with respect to an optical axis of the camera 80.

From the target image illustrated in the upper part of FIG. 6, the image recognition unit 112 identifies a group of markers to which barcodes indicating the same identification code are allocated. Specifically, the image recognition unit 112 identifies a group of the four markers 531, 532, 533, and 534 to which the identification code of the display device region 53 is allocated, a group of the two markers 541 and 542 to which the identification code of the display device region 54 is allocated, and a group of the two markers 551 and 552 to which the identification code of the display device region 55 is allocated. With this configuration, as illustrated in a left figure in a middle part of FIG. 6, the image recognition unit 112 identifies the display device region 53 as a trapezial image region having four corners corresponding to the positions on the target image of the four markers 531, 532, 533, and 534.

In addition, as illustrated in a center figure in the middle part of FIG. 6, the image recognition unit 112 identifies the display device region 54 as a rectangular image region having two diagonal corners corresponding to the positions on the target image of the two markers 541 and 542. Similarly, as illustrated in a right figure in the middle part of FIG. 6, the image recognition unit 112 identifies the display device region 55 as a rectangular image region having two diagonal corners corresponding to the positions on the target image of the two markers 551 and 552.

Next, based on the identified trapezial image region (left figure in the middle part of FIG. 6.) of the display device region 53, the image recognition unit 112 calculates a correction function for correcting image distortion. In the first embodiment, the correction function is defined by a projective transformation matrix for correcting the identified trapezial image region of the display device region 53 to a rectangular image.

Using a projective transformation matrix defining the calculated correction function, the image recognition unit 112 corrects each image in the middle part of FIG. 6, and obtains corrected partial images of the display device regions 53, 54, and 55 as illustrated in a lower part of FIG. 6. The image recognition unit 112 transmits the corrected partial image of the display device regions 53, 54, and 55 to the state determination unit 113. In addition, the image recognition unit 112 stores the corrected partial images of the display device region 53, 54, and 55 into the memory 12 as part of the image data 122 in association with the target image.

Note that, in the example illustrated in FIG. 6, image correction is performed on the respective image regions of the display device regions 53, 54, and 55 illustrated in the middle part of FIG. 6 that have been identified from the target image illustrated in the upper part of FIG. 6, and the corrected partial image illustrated in the lower part of FIG. 6 are acquired, but a procedure of image correction is not limited to this. For example, the image recognition unit 112 may perform image correction on the entire target image illustrated in the upper part of FIG. 6, using the correction function calculated as described above, and directly acquire the corrected partial images of the display device regions 53, 54, and 55 as illustrated in the lower part of FIG. 6, from the corrected target image.

The image recognition unit 112 also generates numerical data indicating numerical values displayed on the display 50, based on the target image acquired by the acquisition unit 111.

Specifically, based on the corrected partial image of the display device region 53 in which the display 50 is arranged, the image recognition unit 112 calculates a size in the target image of a specific symbol displayed in the specific symbol display unit 502 of the display 50. Then, the image recognition unit 112 estimates a character size in the target image of a numerical value displayed in the display 50, based on the calculated size of the specific symbol. By image recognition processing that uses the above-described estimated character size, the image recognition unit 112 generates numerical data indicating a numerical value displayed in the display 50. With this configuration, because character recognition is performed using an appropriate character size, it is possible to reduce a possibility that a displayed numerical value is erroneously recognized and incorrect numerical data is generated.

The numerical data can include numerical data on test force, a piston displacement, and the like, such as "50.1215" and "16.6601" illustrated in FIG. 2, aside from numerical data of the number of cycles displayed in the number of cycles display unit 501 of the display 50. The image recognition unit 112 transmits the above-described generated numerical data of the number of cycles to the update unit 114. In addition, the image recognition unit 112 stores the above-described generated numerical data excluding the number of cycles, into the memory 12 as part of the numerical data 125 in association with the target image.

The state determination unit 113 determines a state of the material testing machine 20 based on the target image acquired by the acquisition unit 111. Specifically, based on the partial image of the display device region 54 and the partial image of the display device region 55 that have been extracted by the image recognition unit 112 determines a hydraulic pressure source state of the material testing machine 20 that is indicated by a combination of lighting modes of the display lamps 51*a*, 51*b*, 51*c*, and 51*d*, and a test state of the material testing machine 20 that is indicated by a combination of lighting modes of the display lamps 52*a* and 52*b*. With this configuration, the user needs not determine a state of the material testing machine that is indicated by the combination of lighting modes, by itself. The convenience of the user therefore improves. Note that the partial image of the display device region 54 in which the display lamps 51*a*, 51*b*, 51*c*, and 51*d* are arranged, and the partial image of the display device region 55 in which the display lamps 52*a* and 52*b* are arranged each correspond to an example of a "first captured image".

The state determination unit 113 estimates a state of the material testing machine 20 from the first captured image using artificial intelligence, for example. The hydraulic pressure state recognition model 123*a* obtained by learning, by machine learning, a relationship between captured images of combinations of various lighting modes of the display lamps 51*a*, 51*b*, 51*c*, and 51*d*, and hydraulic pressure source states of the material testing machine 20 that correspond to these combinations is preliminarily stored in the memory 12. In addition, the test state recognition model 123*b* obtained by learning, by machine learning, a relationship between captured images of combinations of various lighting modes of the display lamps 52*a* and 52*b*, and test states of the material testing machine 20 that correspond to these combinations is preliminarily stored in the memory 12. The hydraulic pressure state recognition model 123*a* and the test state recognition model 123*b* correspond to a state recognition model.

The state determination unit 113 estimates a hydraulic pressure source state of the material testing machine 20 by inputting the first captured image being the partial image of the display device region 54 that has been extracted from the target image, to the hydraulic pressure state recognition model 123*a*. In addition, the state determination unit 113 estimates a test state of the material testing machine 20 by inputting the first captured image being the partial image of the display device region 55 that has been extracted from the target image, to the test state recognition model 123*b*. With this configuration, the state determination unit 113 needs not individually recognize a lighting mode of each display lamp. The state determination unit 113 can therefore promptly determine the state of the material testing machine 20. Note that the first captured image being the partial image of the display device region 54 to be input to the hydraulic pressure state recognition model 123*a*, and the first captured image being the partial image of the display device region 55 to be input to the test state recognition model 123*b* can be each assumed to be a partial image having been subjected to the correction of image distortion in the image recognition unit 112.

The outputs of the hydraulic pressure state recognition model 123*a* and the test state recognition model 123*b* respectively include an estimation result of a hydraulic pressure source state and an accuracy of the estimation, and an estimation result of a test state and accuracy of the estimation. The above-described accuracy of estimation is a value indicating a certainty of corresponding estimation on percentage.

Based on the result of the above-described estimation that uses the hydraulic pressure state recognition model 123*a*, the state determination unit 113 determines a hydraulic pressure source state of the material testing machine 20, and sets an accuracy of the above-described estimation that has been output by the hydraulic pressure state recognition model 123*a*, as a determination accuracy of the determination. The state determination unit 113 adds warning information corresponding to the above-described determination accuracy, to data indicating a determination result of a hydraulic pressure source state, and outputs the data to the output unit 115. The warning information is, for example, "GOOD" indicating that the determination accuracy is equal to or larger than a predetermined value, and is good, or "WARNING" indicating that the determination accuracy is smaller than a predetermined value and is not good. With this configuration, the user can easily recognize the level of reliability of the above-described determination result from warning information added to the determination result. A specific procedure of the hydraulic pressure source state determination will be described later with reference to FIG. 10.

Similarly, based on the result of the above-described estimation that uses the test state recognition model 123*b*, the state determination unit 113 determines a test state of the material testing machine 20, and sets an accuracy of the above-described estimation that has been output by the test state recognition model 123*b*, as a determination accuracy of the determination. The state determination unit 113 adds warning information corresponding to the above-described determination accuracy, to data indicating a determination result of a test state, and outputs the data to the output unit 115. The warning information is "GOOD" or "WARNING" depending on whether the determination accuracy is equal to or larger than a predetermined value or smaller than the predetermined value, for example. A specific procedure of the test state determination will be described later with reference to FIG. 11.

The update unit 114 determines a number of cycles determined value being a value of the number of cycles to be associated with a captured image, based on numerical data of the number of cycles that has been generated by the image recognition unit 112 from a series of captured images during a fatigue test. Specifically, based on numerical data of number of cycles that has been generated from a series of the above-described captured images, the update unit 114 updates a number of cycles determined value to be associated with the target image, to a number of cycles determined value (latest value) associated with a latest image, or maintains at the latest value. Here, the latest image refers to a captured image acquired by the acquisition unit 111 immediately before the target image. Hereinafter, a value of numerical data of the number of cycles that has been generated by the image recognition unit 112 from a captured image will be referred to as a number of cycles generated value.

More specifically, the update unit 114 obtains a regression line, with respect to a time, of a number of cycles generated value generated from at least three captured images captured before the target image. Then, when an amount of difference from the above-described regression line of a target value being a number of cycles generated value generated from the target image is equal to or smaller than a predetermined value, the update unit 114 updates the number of cycles determined value from the above-described target value. With this configuration, the update unit 114 can associate, with a captured image, a number of cycles determined value with high reliability that considers a time change inclination of the number of cycles that is indicated by the regression line. The update unit 114 transmits the above-described updated number of cycles determined value to the output unit 115, and also stores the number of cycles determined value into the memory 12 as part of the numerical data 125 in association with the target image.

On the other hand in a case where the above-described difference amount is not equal to or smaller than the predetermined value, the update unit 114 determines whether or not a predetermined number of number of cycles generated values generated from a predetermined number of captured images captured before the target image are successively the same fixed value. Then, when the predetermined number of number of cycles generated values are successively the same fixed value, the update unit 114 updates a number of cycles determined value to be associated with the target image, from the fixed value. In addition, when the predetermined number of number of cycles generated values are successively the same fixed value, the update unit 114 updates a regression line. More specifically, the update unit 114 discards the current regression line, and newly calculates a regression line from three or more number of cycles generated values generated from captured images to be captured thereafter. With this configuration, even in a case where a stress application cycle of a fatigue test is changed, and a time change inclination of the number of cycles changes, the update unit 114 can prevent an incorrect number of cycles determined value from being associated with a captured image. In addition, after the regression line is updated, the update unit 114 can appropriately recognize a new time change inclination of the number of cycles using the updated regression line, and associate a number of cycles determined value with high reliability with a captured image.

On the other hand when at least one of a predetermined number of number of cycles generated values is a value different from the others, the update unit 114 does not update a number of cycles determined value to be associated with the target image, and maintains the number of cycles determined value at the same value as the latest value. With this configuration, in a case where an inappropriate change occurs in numerical data of the number of cycles in a period in which a time change of the number of cycles does not occur, the update unit 114 can maintain a number of cycles determined value at the latest value, and an error of the number of cycles determined value can be suppressed to be small. When the update unit 114 does not update a number of cycles determined value, the update unit 114 adds warning information to the number of cycles determined value maintained at the same value as the above-described latest value, and transmits the number of cycles determined value to the output unit 115. The warning information can be "WARNING", for example. From the warning information added to the number of cycles determined value, the user can thereby easily recognize that the reliability of the number of cycles determined value might be low. Note that, when the update unit 114 has updated a number of cycles determined value, the update unit 114 may add warning information such as "GOOD", for example, to the number of cycles determined value. The update unit 114 stores the above-described number of cycles determined value to which warning information is added, into the memory 12 as part of the numerical data 125 in association with the target image.

Each time the acquisition unit 111 acquires a captured image, the output unit 115 outputs, to the display unit 14, a data display screen including the acquired captured image (i.e., target image), the display of a hydraulic pressure source state and a test state determined by the state determination unit 113 from the target image, and a number of cycles determined value determined by the update unit 114. In addition to or in place of this, the output unit 115 may print and output, using a printer device (not illustrated), the display of the hydraulic pressure source state and the test state, and the number of cycles determined value.

Figure 7:
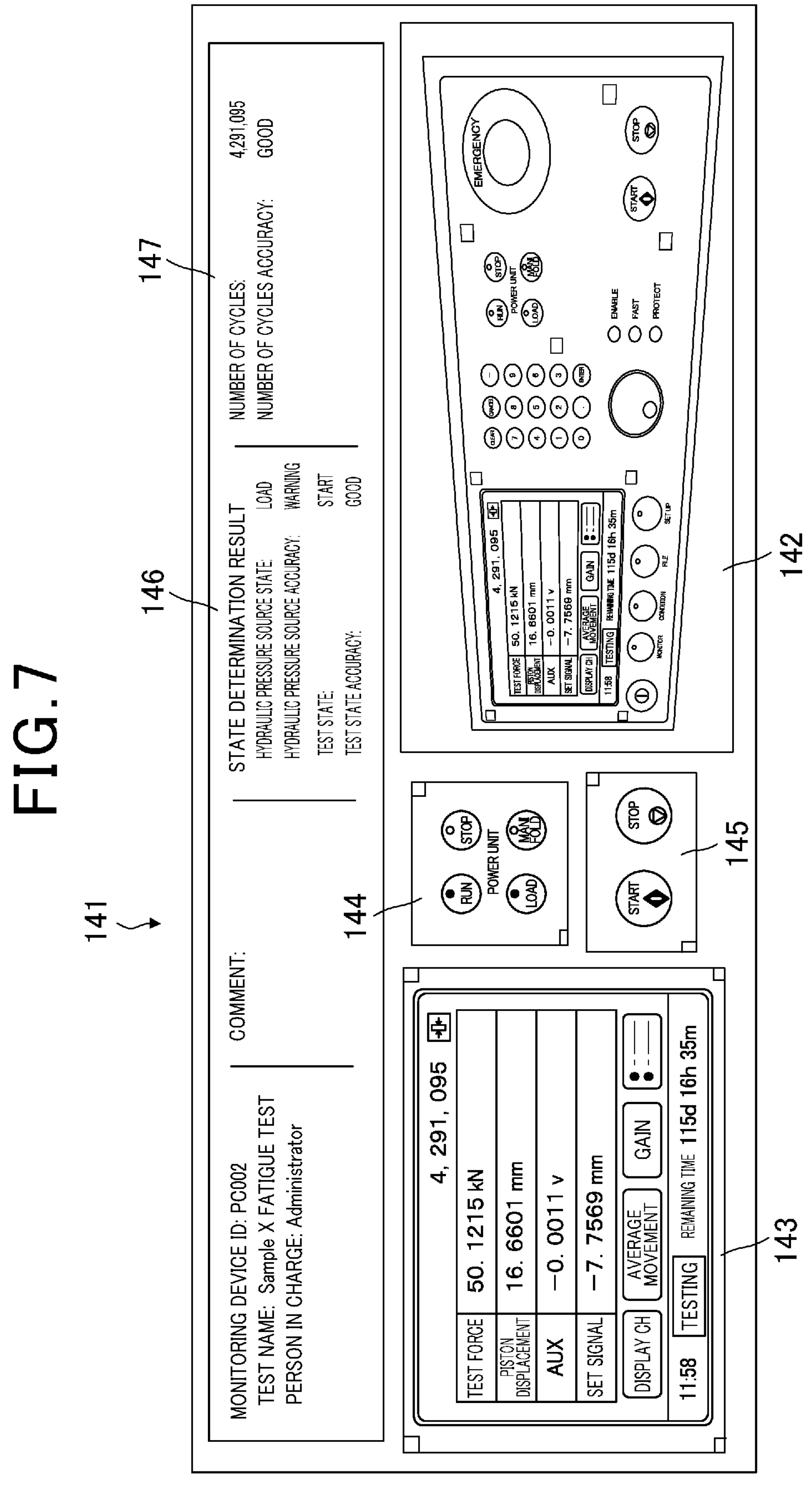
FIG. 7 is a diagram illustrating an example of a data display screen to be output by an output unit to a display unit.

FIG. 7 is a diagram illustrating an example of a data display screen to be output by the output unit 115 to the display unit 14. A data display screen 141 illustrated in FIG. 7 includes a target image display unit 142, partial image display units 143, 144, and 145, a determination result display unit 146, and a numerical display unit 147.

The target image is displayed in the target image display unit 142. The partial images of the display device regions 53, 54, and 55 that have been extracted the target image and corrected in image distortion are respectively displayed in the partial image display units 143, 144, and 145. Determination results of a hydraulic pressure source state and a test state of the material testing machine 20 that have been determined based on the target image are indicated in the determination result display unit 146. In addition, a number of cycles determined value of the target image is displayed in the numerical display unit 147.

In FIG. 7, a "hydraulic pressure source accuracy" and a "test state accuracy" displayed in the determination result display unit 146 respectively indicate warning information added to the determination results of the hydraulic pressure source state and test state that have been received from the state determination unit 113. In addition, a "number of cycles accuracy" displayed in the numerical display unit 147 in FIG. 7 is displayed based on warning information added to a number of cycles display value that has been received by the output unit 115 from the update unit 114.

The monitoring device 10 including the above-described configuration generates numerical data and data indicating a state determination result of the material testing machine 20, from captured images of the display 50 and the display lamps 51*a*, 51*b*, 51*c*, 51*d*, 52*a*, and 52*b*, which are display devices provided on the display panel 41 of the control device 40. In addition, the generated numerical data and data of determination result are output to the display unit 14, and stored into the memory 12 in association with the captured images.

With this configuration, the user can easily recognize an operating state of the material testing machine 20 from the above-described generated numerical data and data of the determination result. Accordingly, for example, even in a case where captured images captured at a predetermined time interval during the execution of a fatigue test by the material testing machine 20 becomes an enormous number, the user can easily recognize a changing point (or change timing) of a state of the material testing machine 20 from these enormous number of captured images by viewing the output of numerical data and data of determination results that have been generated based on the captured images.

Note that, in the present embodiment, a material testing machine has been described as an example, but information can be extracted from captured images by acquiring graphic information represented by a waveform displayed on display screens of a plurality of other analyzers, and applying a known wave analysis algorithm or a graphic analysis algorithm to the acquired graphic information. In addition, information is not limited to the graphic information, and the effect of this application can be achieved by merely extracting warning display or the like.

1.4. Processing on Monitoring Device

1.4.1 Overall Flow

Figure 8:
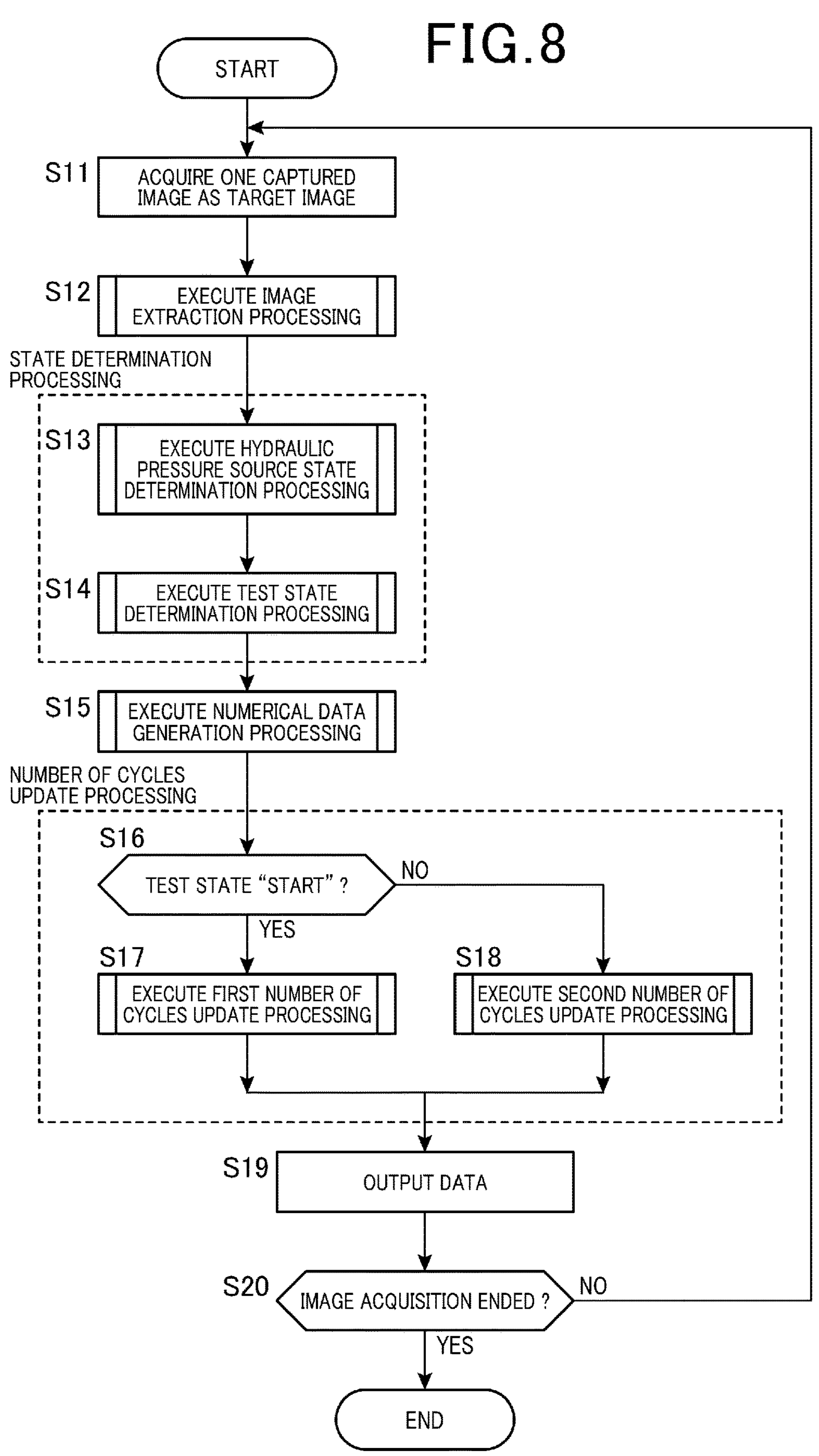
FIG. 8 is a flowchart illustrating an example of processing to be executed by the monitoring device.

Next, a procedure of an operation of the monitoring device 10 will be described with reference to the flowchart illustrated in FIG. 8. The processing illustrated in FIG. 8 is started when the user inputs an execution instruction via the input unit 13, for example. When inputting an execution instruction, the user is assumed to be able to input an acquisition end condition of captured images, a target acquisition number of times of captured images, or a target acquisition time, for example.

If the processing starts, the acquisition unit 111 acquires one captured image from the camera 80 (S11). The acquired captured image becomes a target image. Next, the image recognition unit 112 executes image extraction processing on the target image (S12). In the image extraction processing, the image recognition unit 112 extracts, from the target image, a partial image of the display device region 53 in which the display 50 is arranged, the partial image of the display device region 54 in which the display lamps 51*a*, 51*b*, 51*c*, and 51*d* are arranged, and the partial image of the display device region 55 in which the display lamps 52*a* and 52*b* are arranged. The details of the image extraction processing will be described later with reference to FIG. 9.

Next, the state determination unit 113 executes state determination processing. The state determination processing includes hydraulic pressure source state determination processing (S13) and test state determination processing (S14). In the hydraulic pressure source state determination processing, the state determination unit 113 estimates a hydraulic pressure source state by inputting the partial image of the display device region 54 extracted from the target image, to the hydraulic pressure state recognition model 123*a*, and determines a hydraulic pressure source state of the material testing machine 20 based on a result and an accuracy of the estimation. In addition, in the test state determination processing, the state determination unit 113 estimates a test state by inputting the partial image of the display device region 55 extracted from the target image, to the test state recognition model 123*b*, and determines a test state of the material testing machine 20 based on a result and an accuracy of the estimation. The details of the hydraulic pressure source state determination processing and the test state determination processing will be described later with reference to FIGS. 10 and 11.

Next, the image recognition unit 112 executes numerical data generation processing (S15). In the numerical data generation processing, the image recognition unit 112 generates numerical data of numerical display displayed on the display 50, based on the partial image of the display device region 53 extracted from the target image. The numerical data generation processing will be described later with reference to FIG. 12.

Subsequently, the update unit 114 executes number of cycles update processing. In the number of cycles update processing, the update unit 114 first determines whether the test state determined by the state determination unit 113 in the test state determination processing (S14) is "START" (i.e., test start state) (S16). Then, when the test state is "START" (S16; YES), the update unit 114 executes first number of cycles update processing (S17). On the other hand when the test state is not "START", that is, when the test state is "STOP" (i.e., test stopped state) (S16; NO), the update unit 114 executes second number of cycles update processing (S18).

In the first number of cycles update processing, based on the number of cycles increasing during the execution of a fatigue test, the update unit 114 determines a number of cycles determined value to be associated with the target image, from a change in number of cycles generated value generated from a series of captured images. In addition, in the second number of cycles update processing, based on the number of cycles not changing when a fatigue test is suspended, the update unit 114 determines a number of cycles determined value to be associated with the target image, from a number of cycles generated value generated from a series of captured images. The first number of cycles update processing and the second number of cycles update processing will be described later with reference to FIGS. 13 and 14.

Next, the output unit 115 outputs data indicating results of the state determination processing and the number of cycles update processing, to the display unit 14 (S19). Specifically, the output unit 115 displays a data display screen of the target image as illustrated in FIG. 7, for example, on the display unit 14. Subsequently, the acquisition unit 111 determines whether the acquisition of captured images has ended, based on the above-described acquisition end condition input to the input unit 13 when the user starts execution of the processing in FIG. 8 (S20).

Then, when the acquisition of captured images has ended (S20; YES), the acquisition unit 111 ends the processing. On the other hand when the acquisition of captured images has not ended (S20; NO), the acquisition unit 111 returns to step S11, and acquires a new captured image.

1.4.2 Operation in Image Extraction Processing

FIG. 9 is a flowchart illustrating an example of a procedure of image extraction processing in the processing illustrated in FIG. 8.

The "image extraction processing" is processing of extracting, from the target image, a partial image of the display device region 53 in which the display 50 is arranged, the partial image of the display device region 54 in which the display lamps 51*a*, 51*b*, 51*c*, and 51*d* are arranged, and the partial image of the display device region 55 in which the display lamps 52*a* and 52*b* are arranged.

In the image extraction processing, first of all, the image recognition unit 112 detects markers appearing in the target image (S121). A barcode for identifying a region in which a display device to which a marker is allocated is arranged is allocated to the marker. The image recognition unit 112 identifies, for each group of markers having the same identification code, an image region on the target image that corresponds to a region in which a display device is arranged, based on the respective positions of the markers and the identification code (S122). In the first embodiment and each embodiment to be described below, a region in which a display device is arranged includes the display device region 53 in which the display 50 being a numerical display device is arranged, the display device region 54 in which the display lamps 51*a*, 51*b*, 51*c*, and 51*d* are arranged, and the display device region 55 in which the display lamps 52*a* and 52*b* is arranged.

Based on the positions on the captured image of four markers having the same identification code, the image recognition unit 112 calculates a correction function for correcting image distortion of the captured image (S123). As described above, this correction function is defined by the projective transformation matrix, for example. The image recognition unit 112 corrects image distortion of the image region identified in step S122, using the above-described calculated correction function (S124). The image recognition unit 112 extracts each of the above-described corrected image regions as a partial image (S125). The image recognition unit 112 transmits the partial image of each of the above-described extracted regions to the state determination unit 113, and also stores the partial image into image data of the memory 12 as part of the image data 122 in association with the captured image.

1.4.3 Operation in Hydraulic Pressure Source State Determination Processing

Figure 10:
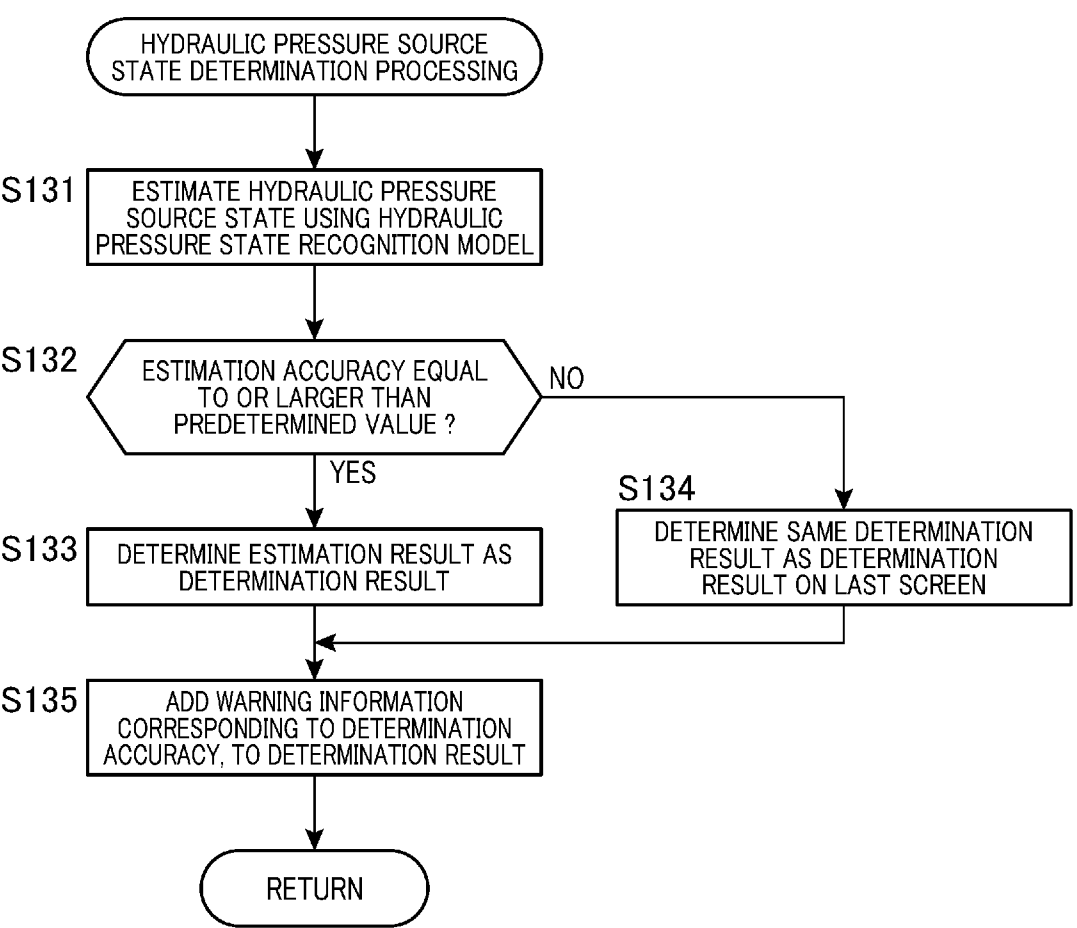
FIG. 10 is a flowchart illustrating an example of a procedure of hydraulic pressure source state determination processing in FIG. 8.

FIG. 10 is a flowchart illustrating an example of a procedure of hydraulic pressure source state determination processing in FIG. 8.

The "hydraulic pressure source state determination processing" is processing of determining a hydraulic pressure source state of the material testing machine 20 based on the partial image of the display device region 54 extracted from the target image.

In the hydraulic pressure source state determination processing, first of all, the state determination unit 113 estimates a hydraulic pressure source state of the material testing machine 20 by inputting the partial image of the display device region 54 in which the display lamps 51*a*, 51*b*, 51*c*, and 51*d* are arranged that has been received from the image recognition unit 112, to the hydraulic pressure state recognition model 123*a* (S131). Next, the state determination unit 113 determines whether an estimation accuracy of the above-described estimation output by the hydraulic pressure state recognition model 123*a* is equal to or larger than a predetermined value (for example, 70%) (S132).

Then, when the above-described estimation accuracy is equal to or larger than a predetermined value (S132; YES), the state determination unit 113 determines the estimation result obtained using the hydraulic pressure state recognition model 123*a*, as a determination result of a hydraulic pressure source state for the target image (S133). On the other hand when the above-described estimation accuracy is smaller than the predetermined value (S132; NO), the state determination unit 113 determines, as a determination result for the target image, the same determination result as a hydraulic pressure source state already determined for the latest image (S134).

Next, the state determination unit 113 sets the above-described estimation accuracy output by the hydraulic pressure state recognition model 123*a*, as a determination accuracy, and adds warning information corresponding to the determination accuracy, to the determination result determined in step S133 or S134 (S135). The state determination unit 113 transmits the determination result of the hydraulic pressure source state to which warning information is added, to the output unit 115, and also stores the determination result into the memory 12 as part of the determination result data 124 in association with the target image.

1.4.4 Processing in Test State Determination Processing

FIG. 11 is a flowchart illustrating an example of a procedure of test state determination processing in FIG. 8.

The "test state determination processing" is processing of determining a test state of the material testing machine 20 based on the partial image of the display device region 55 extracted from the target image.

In the test state determination processing, first of all, the state determination unit 113 estimates a test state of the material testing machine 20 by inputting the partial image of the display device region 55 in which the display lamps 52*a* and 52*b* are arranged that has been received from the image recognition unit 112, to the test state recognition model 123*b* (S1401). This estimation is regarded as first estimation. In this estimation, the test state recognition model 123*b* outputs an estimation accuracy of the estimation.

Next, the state determination unit 113 estimates a test state of the material testing machine 20 from the display of the test state display unit 503 of the display 50 based on the partial image of the display device region 53 that has been received from the image recognition unit 112 (S1402) This estimation is regarded as second estimation. Specifically, the state determination unit 113 counts the number of green pixels and the number of red pixels in the test state display unit 503, for example, and calculates ratios of the number of green pixels and the number of red pixels with respect to the total counted number, on percentage, for example. Then, when the ratio of the number of green pixels is larger than the ratio of the number of red pixels by 20% or more, the state determination unit 113 estimates that the display of the test state display unit 503 is "testing", and a test state is "START", and determines the ratio of the number of green pixels as an estimation accuracy of the estimation.

In addition, when the ratio of the number of red pixels is larger than the ratio of the number of green pixels by 20% or more, the state determination unit 113 estimates that the display of the test state display unit 503 is "suspended", and a test state is "STOP", and determines the ratio of the number of red pixels as an estimation accuracy of the estimation. On the other hand when a difference between the ratios of the number of green pixels and the number of red pixels is smaller than 20%, the state determination unit 113 determines that the display of the test state display unit 503 and the estimation of test state are undetermined.

Next, the state determination unit 113 determines whether the result of the first estimation in step S141 and the result of the second estimation in step S1402 are the same (S1403). Then, when the result of the first estimation and the result of the second estimation are the same (S1403; YES), the state determination unit 113 determines the result of the first estimation or the second estimation as a determination result of the test state (S1404).

On the other hand when it is determined in step S1403 that the result of the first estimation and the result of the second estimation are not the same (S1403; NO), the state determination unit 113 determines whether the result of the second estimation is undetermined (S1405). Then, when the result of the second estimation is not undetermined (S1405; NO), the state determination unit 113 determines the result of the second estimation as a determination result of the test state (S1406).

On the other hand when it is determined in step S1405 that the result of the second estimation is undetermined (S1405; YES), the state determination unit 113 determines whether an estimation accuracy of the first estimation is equal to or larger than a predetermined value (for example, 90%) (S1407). Then, when an estimation accuracy of the first estimation is equal to or larger than a predetermined value (S1407; YES), the state determination unit 113 determines the result of the first estimation as a determination result of the test state (S1408).

In addition, on the other hand when it is determined in step S1407 that an estimation accuracy of the first estimation is smaller than the predetermined value (S1407; NO), the state determination unit 113 determine, as the determination result of this test state (i.e., for target image), the same determination result as a determination result of a test state that has already been determined for the latest image (S1409).

Next, the state determination unit 113 adds warning information corresponding to a determination accuracy, to the determination result of the test state determined in step S1404, S1406, S1408, or S1409 (S1410). When a determination result is determined in step S1404, a determination accuracy can be set as 95%, for example. In addition, when a determination result is determined in step S1406, a determination accuracy of the determination result can be set to the same value as an estimation accuracy in the second estimation.

In addition, when a determination result is determined in step S1408 or S1409, a determination accuracy of the determination result can be set to the same value as an estimation accuracy in the first estimation. When the determination accuracy is equal to or larger than the predetermined value (for example, 90%), the state determination unit 113 can add "GOOD" to a determination result as warning information, and if the determination accuracy is smaller than the predetermined value, the state determination unit 113 can add "WARNING" as warning information.

The state determination unit 113 transmits the determination result of the test state to which warning information is added, to the output unit 115, and also stores the determination result into the memory 12 as part of the determination result data 124 in association with the target image.

1.4.5 Processing in Numerical Data Generation Processing

Figure 12:
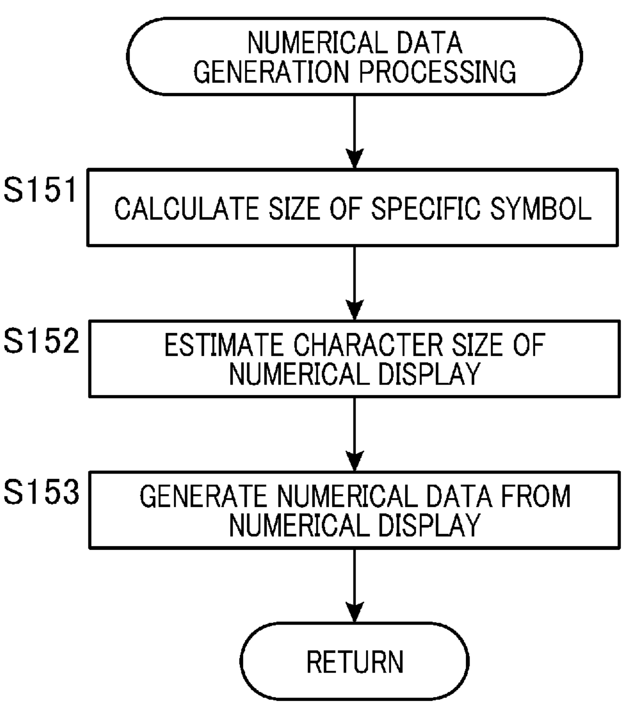
FIG. 12 is a flowchart illustrating an example of a procedure of numerical data generation processing in FIG. 8.

FIG. 12 is a flowchart illustrating an example of a procedure of numerical data generation processing in FIG. 8.

The "numerical data generation processing" is processing of generating numerical data of numerical display displayed on the display 50, based on the partial image of the display device region 53 extracted from the target image.

First of all, the image recognition unit 112 detects a specific symbol from the partial image of the display device region 53 extracted in the image extraction processing, and calculates a size of the specific symbol in the partial image (S151). In the first embodiment, the specific symbol is a specific icon displayed in the specific symbol display unit 502 of the display 50. Next, the image recognition unit 112 estimates a character size of a numerical display in the above-described partial image of the display device region 53 based on the above-described calculated size of the specific symbol (S152). Then, based on the above-described estimated character size, the image recognition unit 112 recognizes a number in the numerical display on the display 50 that appears in the partial image of the display device region 53, by character recognition processing, and generates numerical data from the numerical display (S153). The image recognition unit 112 transmits numerical data of the number of cycles in the generated numerical data to the update unit 114. In addition, the image recognition unit 112 stores the above-described generated numerical data excluding numerical data of the number of cycles, into the memory 12 as part of the numerical data 125 in association with the target image.

1.4.6 Operation in First Number of Cycles Update Processing

Figure 13:
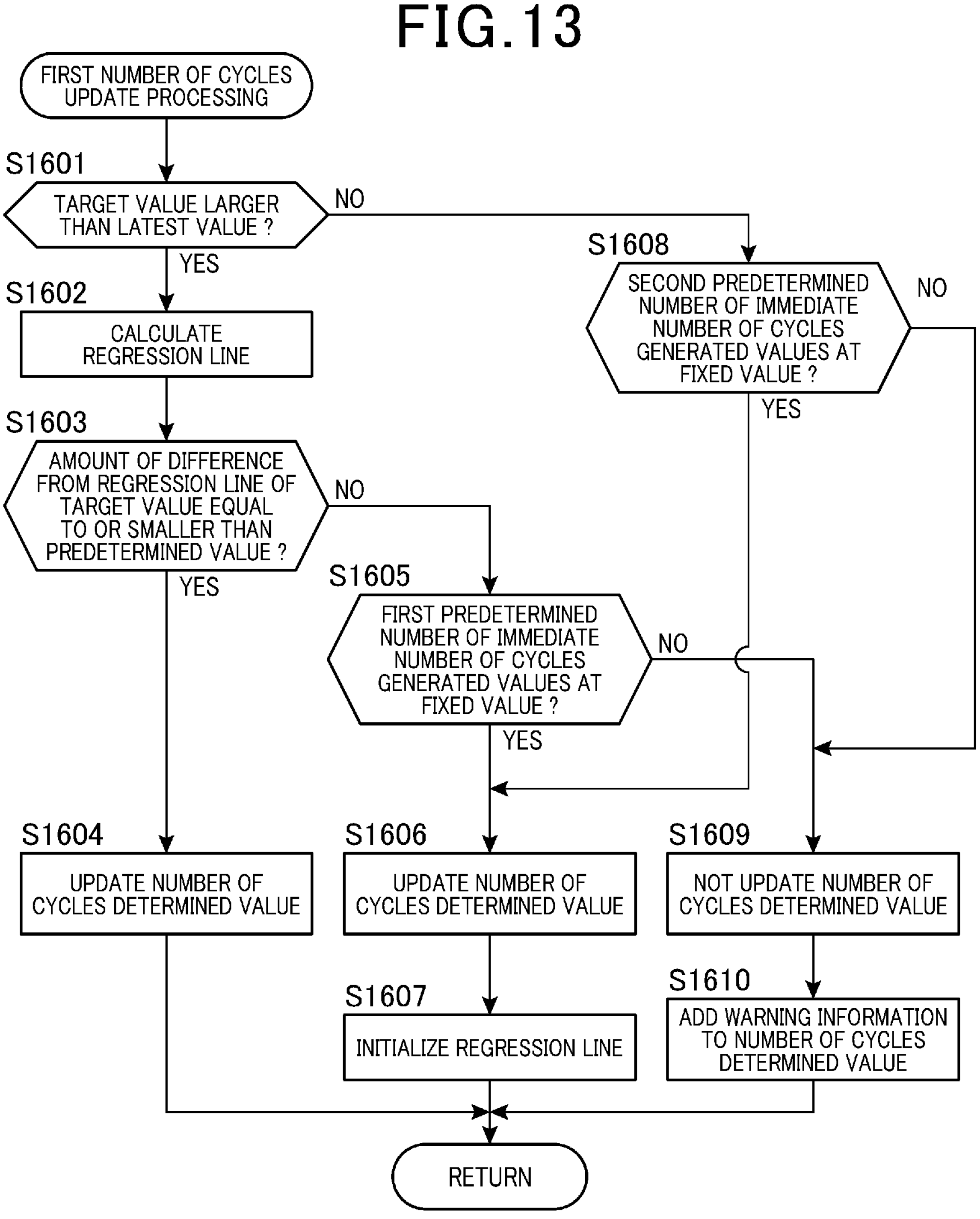
FIG. 13 is a flowchart illustrating an example of a procedure of first number of cycles update processing in FIG. 8.

FIG. 13 is a flowchart illustrating an example of a procedure of first number of cycles update processing in FIG. 8.

The "first number of cycles update processing" is processing of determining a number of cycles determined value to be associated with the target image, when the material testing machine 20 is in the test start state.

As described above, in the first number of cycles update processing, based on the number of cycles increasing during the execution of a fatigue test, the update unit 114 determines whether to update a number of cycles determined value to be associated with the target image, from a latest value (number of cycles determined value associated with a latest image), from a change in number of cycles generated value generated from a series of captured images. As described above, a value indicating numerical data of the number of cycles generated by the image recognition unit 112 from captured images will be referred to as a number of cycles generated value, and a number of cycles generated value for the target image will be referred to as a target value. In addition, a captured image captured immediately before the target image will be referred to as a latest image, and a number of cycles determined value determined by the update unit 114 for the latest image will be referred to as a latest value.

In the first number of cycles update processing, first of all, the update unit 114 determines whether the target value is larger than the latest value (S1601). When the target value is larger than the latest value (S1601; YES), the update unit 114 obtains a regression line, with respect to a time, of a number of cycles generated value, from number of cycles generated values of at least three captured images captured before the target image (S1602). In the first embodiment, the regression line is calculated using number of cycles generated values of immediate three or more and 100 or less captured images including a latest image captured before the target image. For example, the update unit 114 can temporarily store number of cycles generated values of immediate captured image to be used for the calculation of a regression line, into the memory 12 as regression line data, and calculate a regression line from these temporarily stored number of cycles generated values.

The update unit 114 determines whether an amount of difference from the regression line of the target value is equal to or smaller than a predetermined value (for example, ±5%) (S1603). Then, when the difference amount is equal to or smaller than the predetermined value (S1603; YES), the update unit 114 updates a number of cycles determined value with the target value (S1604). The update unit 114 transmits the updated number of cycles determined value to the output unit 115, and also stores the number of cycles determined value into the memory 12 as part of the numerical data 125 in association with the target image.

On the other hand when it is determined in step S1603 that the difference amount exceeds the predetermined value (S1603; NO), the update unit 114 determines whether first predetermined number of immediate number of cycles generated values have been continuously held at a fixed value (S1605). Here, the "first predetermined number of immediate number of cycles generated values" refer to number of cycles generated values generated from first predetermined number of immediate captured images including the target image and a plurality of captured images captured immediately before the target image. In the first embodiment, the first predetermined number is 10, for example. The update unit 114 can perform the determination in step S1603 by temporarily storing immediate number of cycles generated values generated from the first predetermined number of immediate captured images, into the memory 12, for example.

When it is determined in step S1605 that the first predetermined number of immediate number of cycles generated values have been continuously held at the fixed value (S1605; YES), the update unit 114 updates a number of cycles determined value with the above-described fixed value (S1606). The update unit 114 transmits the updated number of cycles determined value to the output unit 115, and also stores the number of cycles determined value into the memory 12 as part of the numerical data 125 in association with the target image.

In addition, the update unit 114 updates and initializes a regression line by excluding number of cycles generated values from the target image and captured images captured before the target image, from a calculation target of a regression line in step S1602 (S1607). Specifically, for example, the update unit 114 deletes the above-described number of cycles generated values to be excluded, from the above-described regression line data temporarily stored in the memory 12.

On the other hand when it is determined in step S1605 that the first predetermined number of immediate number of cycles generated values have not been continuously held at the fixed value (S1605; NO), the update unit 114 does not update a number of cycles determined value (S1609). More specifically, the update unit 114 determines a latest value (i.e., a value of a number of cycles determined value in the latest image) as a number of cycles determined value for the target image. In addition, the update unit 114 adds warning information to the determined number of cycles determined value (S1610). The warning information is "WARNING", for example. The update unit 114 transmits the number of cycles determined value to which warning information is added, to the output unit 115, and also stores the number of cycles determined value into the memory 12 as part of the numerical data 125 in association with the target image.

In addition, on the other hand when it is determined in step S1601 that the target value is equal to or smaller than the latest value (S1601; NO), the update unit 114 determines whether second predetermined number of immediate number of cycles generated values have been continuously held at a fixed value (S1608). In the first embodiment, the second predetermined number is 50, for example. The update unit 114 can perform the determination in step S1608 by temporarily storing the second predetermined number of immediate number of cycles generated values into the memory 12, for example.

Then, when it is determined in step S1608 that the second predetermined number of immediate number of cycles generated values have been continuously held at the fixed value (S1608; YES), the update unit 114 advances the processing to step S1606, and updates a number of cycles determined value with the above-described fixed value.

On the other hand when it is determined in step S1608 that the second predetermined number of immediate number of cycles generated values have not been continuously held at the fixed value (S1608; NO), the update unit 114 advances the processing to step S1609, and does not update a number of cycles determined value. In other words, the update unit 114 determines the latest value as a number of cycles determined value for the target image.

1.4.7 Operation in Second Number of Cycles Update Processing

Figure 14:
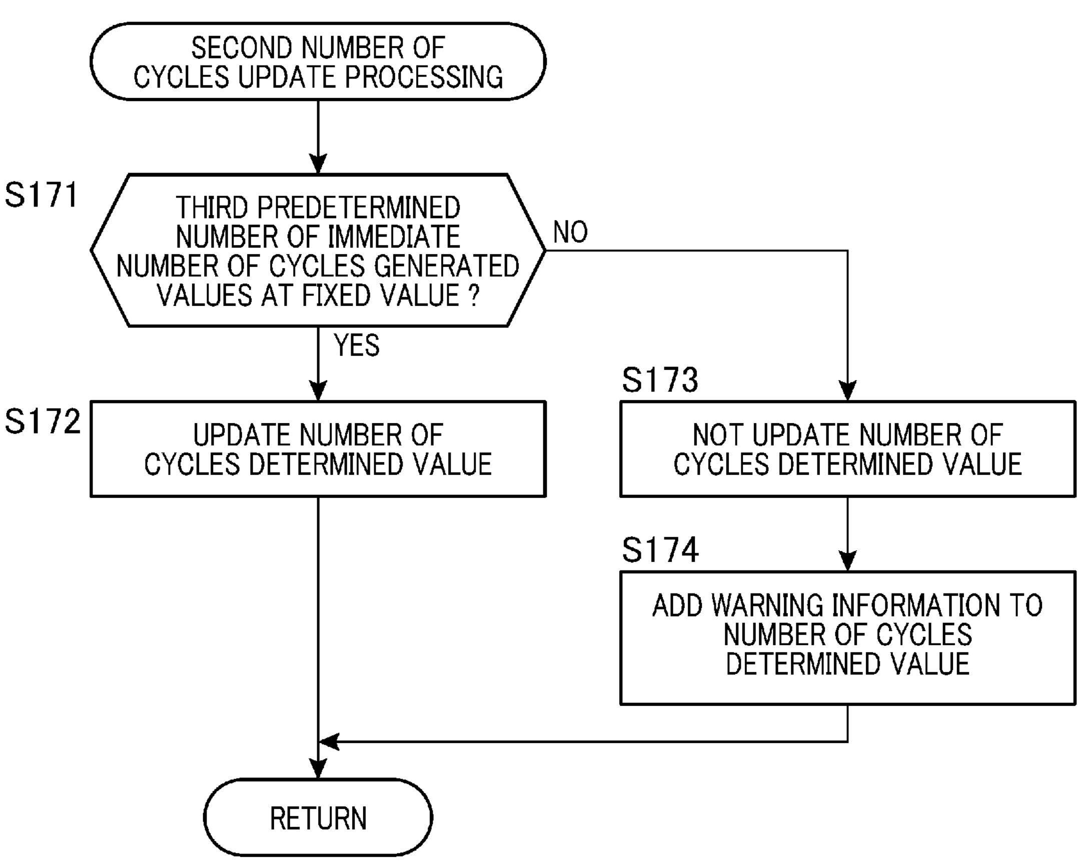
FIG. 14 is a flowchart illustrating an example of a procedure of second number of cycles update processing in FIG. 8.

FIG. 14 is a flowchart illustrating an example of a procedure of second number of cycles update processing in FIG. 8.

The "second number of cycles update processing" is processing of determining a number of cycles determined value to be associated with the target image, when the material testing machine 20 is in a test stopped state.

As described above, in the second number of cycles update processing, based on the number of cycles not changing when a fatigue test is suspended, the update unit 114 determines a number of cycles determined value to be associated with the target image, from a number of cycles generated value generated from a series of captured images.

First of all, the update unit 114 determines whether third predetermined number of immediate number of cycles generated values have been continuously held at a fixed value (S171). Here, the "third predetermined number of immediate number of cycles generated values" refer to number of cycles generated values generated from third predetermined number of immediate captured images including the target image and a plurality of captured images captured immediately before the target image. In the first embodiment, the third predetermined number is 10, for example. The update unit 114 can perform the determination in step S171 by temporarily storing immediate number of cycles generated values generated from the third predetermined number of immediate captured images, into the memory 12, for example.

When it is determined in step S171 that the third predetermined number of immediate number of cycles generated values have been continuously held at the fixed value (S171; YES), the update unit 114 updates a number of cycles determined value with the above-described fixed value (S172) The update unit 114 transmits the updated number of cycles determined value to the output unit 115, and also stores the number of cycles determined value into the numerical data 125 of the memory 12 in association with the target image.

On the other hand when the third predetermined number of immediate number of cycles generated values have not been continuously held at the fixed value (S171; NO), the update unit 114 does not update a number of cycles determined value (S173). In other words, the update unit 114 determines the latest value as a number of cycles determined value for the target image. In addition, the update unit 114 adds warning information to the determined number of cycles determined value (S174). The warning information is "WARNING", for example. The update unit 114 transmits the number of cycles determined value to which warning information is added, to the output unit 115, and also stores the number of cycles determined value into the memory 12 as part of the numerical data 125 in association with the target image.

1.5. Modified Example

1.5.1 Modified Example 1

In the above-described embodiment, one camera 80 that captures images of the display panel 41 of the control device 40 is connected to the monitoring device 10, but the number of cameras connected to the monitoring device 10 is not limited to one. For example, in addition to the camera 80 that captures images of the display panel 41, an additional camera that captures images of the entire material testing machine 20 is connected to the monitoring device 10. In this case, the acquisition unit 111 acquires a captured image of the display panel 41 that has been captured by the camera 80, for example, sets the captured image as a target image, and also acquires the whole image of the material testing machine 20 from the above-described additional camera at the same timing as the target image.

Figure 15:
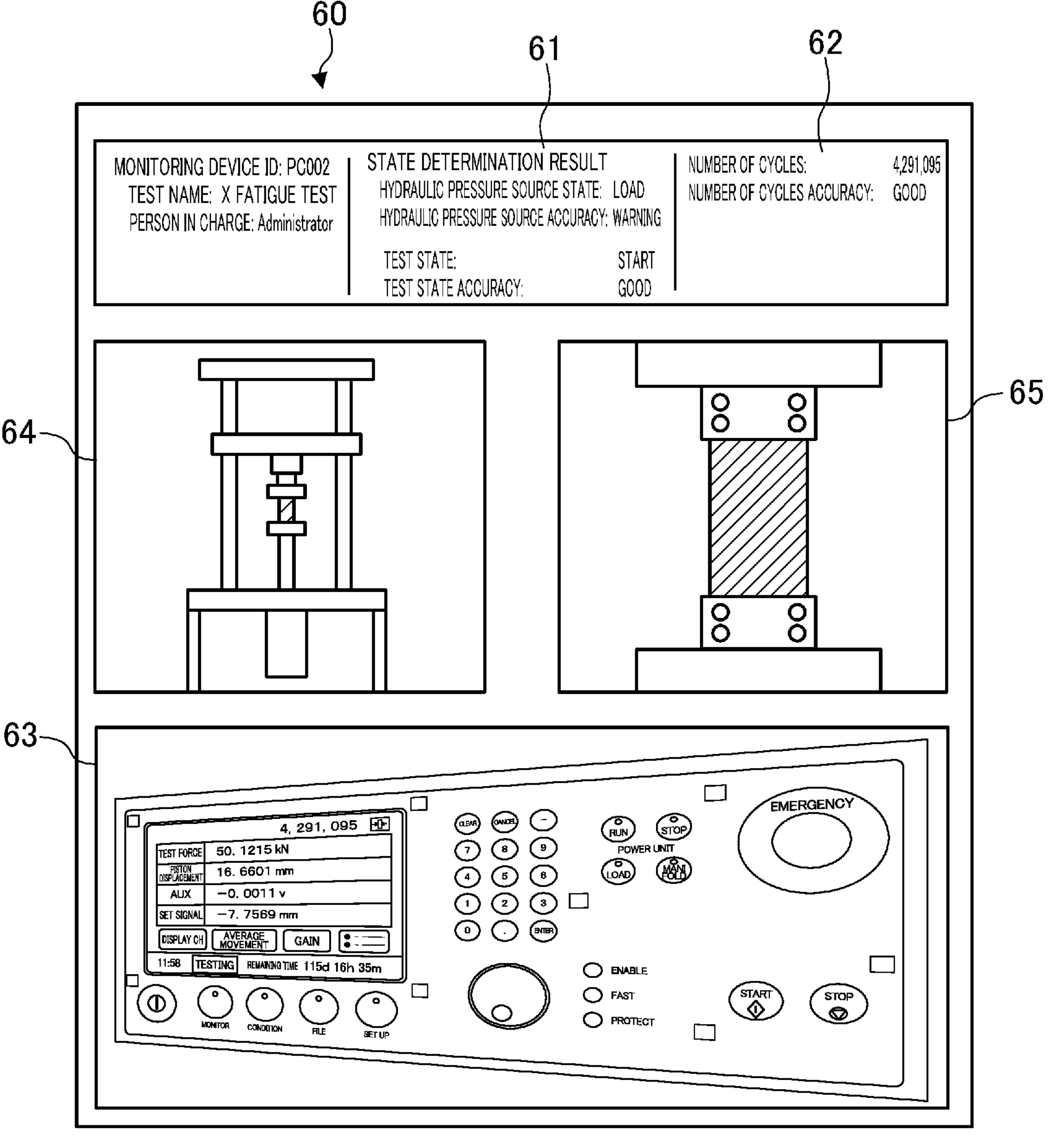
FIG. 15 is a diagram illustrating another example of a data display screen to be output by an output unit to a display unit.

In addition, in this case, the output unit 115 can output a data display screen 60 as illustrated in FIG. 15, to the display unit 14. The data display screen 60 includes, for example, a determination result display unit 61, a numerical display unit 62, a target image display unit 63, a whole image display unit 64, and a test piece image display unit 65. Similarly to the determination result display unit 146 and the numerical display unit 147 on the data display screen illustrated in FIG. 7, determination results of a hydraulic pressure source state and a test state, and a number of cycles determined value are respectively displayed in the determination result display unit 61 and the numerical display unit 62. In addition, similarly to the target image display unit 142 in FIG. 7, a target image (i.e., a captured image of the display panel 41 acquired by the acquisition unit 111 this time) is displayed in the target image display unit 63. Furthermore, a whole image of the material testing machine 20 that has been captured simultaneously with the target image is displayed in the whole image display unit 64, and an enlarged image of a portion near the test piece SP in the whole image is displayed in the test piece image display unit 65.

1.5.2 Modified Example 2

In the above-described embodiment, as an example of a control device that controls the material testing machine 20, the control device 40 including the display panel 41 including one display 50, and six display lamps 51*a*, 51*b*, 51*c*, 51*d*, 52*a*, and 52*b* has been described. Nevertheless, a display panel of a control device is not limited to a display panel having the configuration of the display panel 41. A display panel of a control device needs not include a display as a display device, or may include two or more displays as display devices. In addition, a display panel can include an arbitrary number other than 6 of display lamps as display devices.

Figure 16:
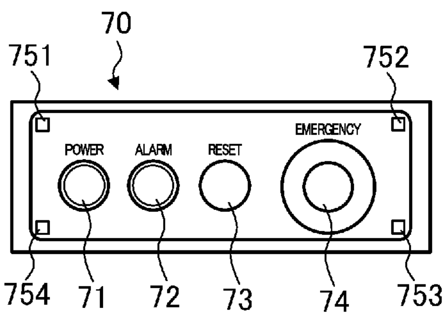
FIG. 16 is a diagram illustrating another example of a display panel of a monitoring device.

For example, a control device can include a display panel 70 having a simple configuration as illustrated in FIG. 16. The display panel 70 having such a simple configuration can be a display panel of an operational box serving as an accessory connected to the control device 40, for example. As an example, as display devices, a display lamp 71 indicating a power state of the hydraulic pressure source 30, and a display lamp 72 for giving a warning of the occurrence of an abnormal state are arranged on the display panel 70 illustrated in FIG. 16. The display lamp 71 and the display lamp 72 can represent a specific state the material testing machine 20 by a combination of their lighting modes.

In addition, a reset button 73 for cancelling a warning of an abnormal state, and an emergency stop switch 74 similar to the emergency stop switch 415 illustrated in FIG. 2 are arranged on the display panel 70. In addition, marker 751,752, 753, and 754, to which barcodes are allocated, and which are similar to the marker 531 and the like that are illustrated in FIG. 2, are arranged at four corners of the display panel 70 having a rectangular shape. The barcodes of these markers include information regarding an identification code indicating that a region indicated by these markers is a region in which the display lamps 71 and 72 each serving as a display device are arranged.

Also in this case, by operations similar to the above-described operations, the monitoring device 10 can acquire a captured image of the display panel 70, determine a specific state of the material testing machine 20 that is indicated by the combination of lighting modes of the display lamps 71 and 72, and output data indicating a result of the determination, to the display unit 14. For example, the memory 12 of the monitoring device 10 stores a learned state recognition model obtained by learning a relationship between various lighting modes of the display lamps 71 and 72, and a specific state of the material testing machine 20, and the state determination unit 113 can determine the above-described specific state using the state recognition model.

2. Second Embodiment

Figure 17:
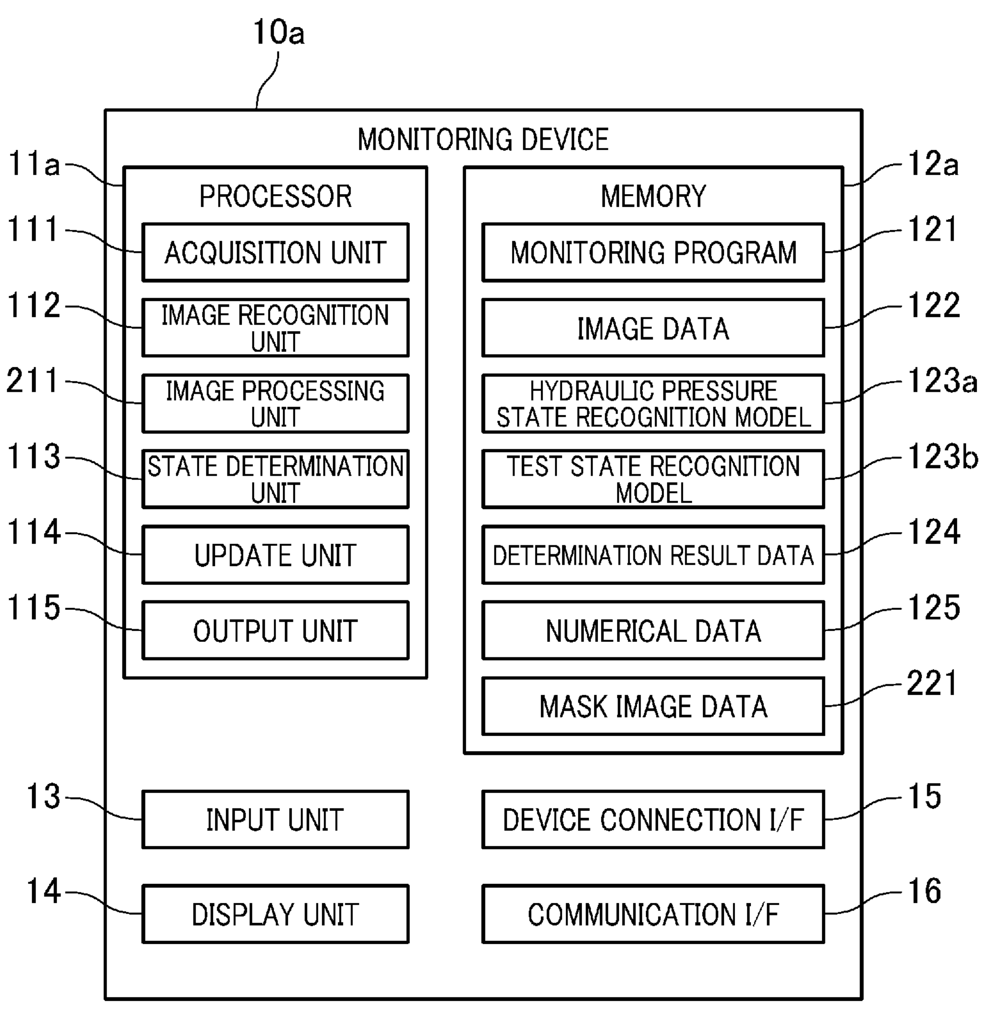
FIG. 17 is a diagram illustrating an example of a configuration of a monitoring device according to a second embodiment.

FIG. 17 is a diagram illustrating an example of a configuration of a monitoring device 10*a* according to a second embodiment. Similarly to the monitoring device 10 described in the first embodiment, the monitoring device 10*a* can be used in combination with the material testing machine 20. Because a use configuration of the monitoring device 10*a* is similar to that in the first embodiment, the description will be omitted. In addition, in the second embodiment, configurations similar to those in the first embodiment are assigned the same reference signs, and the description will be omitted.

As illustrated in FIG. 17, the monitoring device 10*a* includes a processor 11*a*. The processor 11*a* has a configuration similar to the processor 11. More specifically, the processor 11*a* includes an acquisition unit 111, an image recognition unit 112, a state determination unit 113, an update unit 114, and an output unit 115, which have been described above. Furthermore, the processor 11*a* includes an image processing unit 211.

The monitoring device 10*a* includes a memory 12*a*. The memory 12*a* has a configuration similar to the memory 12. More specifically, the memory 12*a* stores a monitoring program 121, image data 122, a hydraulic pressure state recognition model 123*a*, a test state recognition model 123*b*, a determination result data 124, and numerical data 125. Furthermore, the memory 12*a* stores a mask image data 221.

The mask image data 221 is image data of a mask image. The mask image data 221 includes data of a mask image that corresponds to the partial image of the display device region 54 illustrated in FIG. 2, and a mask image that corresponds to the partial image of the display device region 55 illustrated in FIG. 2, for example.

The image processing unit 211 generates a determination partial image by executing image processing using the mask image data 221 on the partial image of the display device region 54 and the partial image of the display device region 55 that have been extracted by the image recognition unit 112. The determination partial image is an image processed for enabling lighting modes of the display lamps 51*a*, 51*b*, 51*c*, and 51*d*, or lighting modes of the display lamps 52*a* and 52*b* to be easily determined. The determination partial image corresponds to an example of a determination image.

The mask image is an image for concealing a part of a partial image. More specifically, if a mask image is overlapped with a partial image extracted by the image recognition unit 112, a part of the partial image enters a concealed state and the remaining parts enter an unconcealed state. Here, a portion in a partial image that is concealed by a mask image will be referred to as a mask region, and a portion in a partial image that is not concealed by a mask image will be referred to as an unmasked region. The image processing unit 211 generates a determination partial image by extracting an unmasked region from a partial image. The unmasked region is a region in which lighting modes of the display lamps 51*a*, 51*b*, 51*c*, and 51*d* or the display lamps 52*a* and 52*b* are easily determined. A mask region corresponds to an example of a first region and an unmasked region corresponds to an example of a second region.

As an example, a case where the state determination unit 113 determines a lighting mode of the display lamp 51*a* will be described. In this case, the state determination unit 113 determines whether the display lamp 51*a* is turned on or off, or determines a lighting color of the display lamp 51*a*. A mask image corresponding to the display device region 54 masks a region not changing in accordance with a change in lighting mode of the display lamp 51*a*, or a region with a small change, in a partial image extracted by the image recognition unit 112. A change in lighting mode includes switch between lighting and extinction of the display lamp 51*a*, and a change in a lighting color of the display lamp 51*a*. Accordingly, an unmasked region of a partial image drastically changes in accordance with a change in lighting mode of the display lamp 51*a*. Thus, by using a determination partial image generated by the image processing unit 211, the state determination unit 113 can determine a lighting mode of the display lamp 51*a* more accurately as compared with a case where a mask image is not used. The same applies to the display lamps 51*b*, 51*c*, and 51*d*, the display lamps 52*a* and 52*b*, and the display device region 55.

A mask image corresponding to the display device region 54 may be an image overlapping the entire partial image obtained by capturing an image of the display device region 54. In addition, a mask image corresponding to the display device region 54 may be images respectively corresponding to the run button 511, the stop button 512, the manifold button 513, and the load application button 514. In other words, a mask image corresponding to the display device region 54 may include four mask images.

Similarly, a mask image corresponding to the display device region 55 may be an image overlapping the entire partial image obtained by capturing an image of the display device region 55. In addition, a mask image corresponding to the display device region 55 may be images respectively corresponding to the start key 521 and the stop key 522. In other words, a mask image corresponding to the display device region 55 may include two mask images.

The image processing unit 211 may perform image processing of a partial image in a case where the state determination unit 113 determines a lighting mode of the display lamp 71 or 72 illustrated in FIG. 16 in Modified Example 2. The display lamp 71 and the display lamp 72 have a simple configuration that can switch between lighting and extinction, for example. Based on a partial image of the display panel 70, the state determination unit 113 determines whether the display lamp 71 is turned on or off, and determines whether the display lamp 72 is turned on or off.

in this case, a mask image corresponding to the display panel 70 masks a portion with a small change in brightness between a light on state and a light off state of the display lamp 71, and a portion with a small change in brightness between a light on state and a light off state of the display lamp 72.

The mask image data 221 may be preliminarily generated a device different from the monitoring device 10*a*, and stored into the memory 12, or may be generated by the monitoring device 10*a*.

Figure 18:
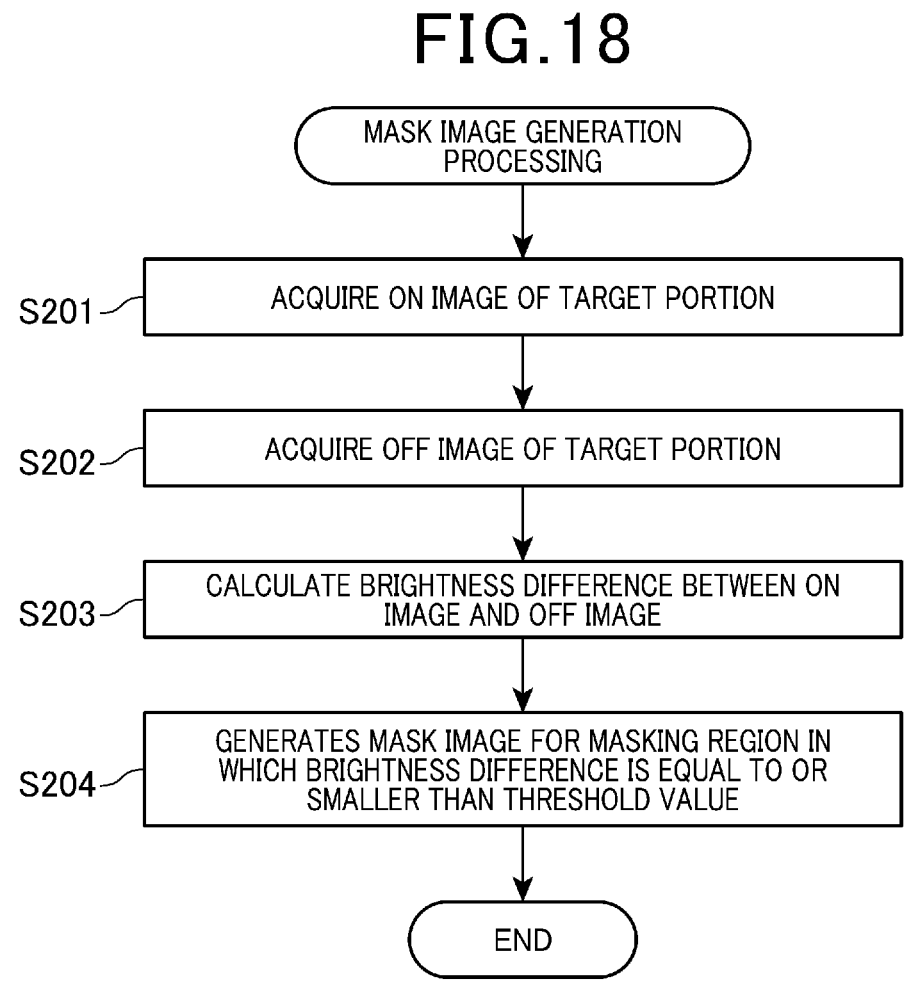

Here, an operation to be performed in a case where the monitoring device 10*a* generates the mask image data 221 is illustrated in FIG. 18.

Figure 19:
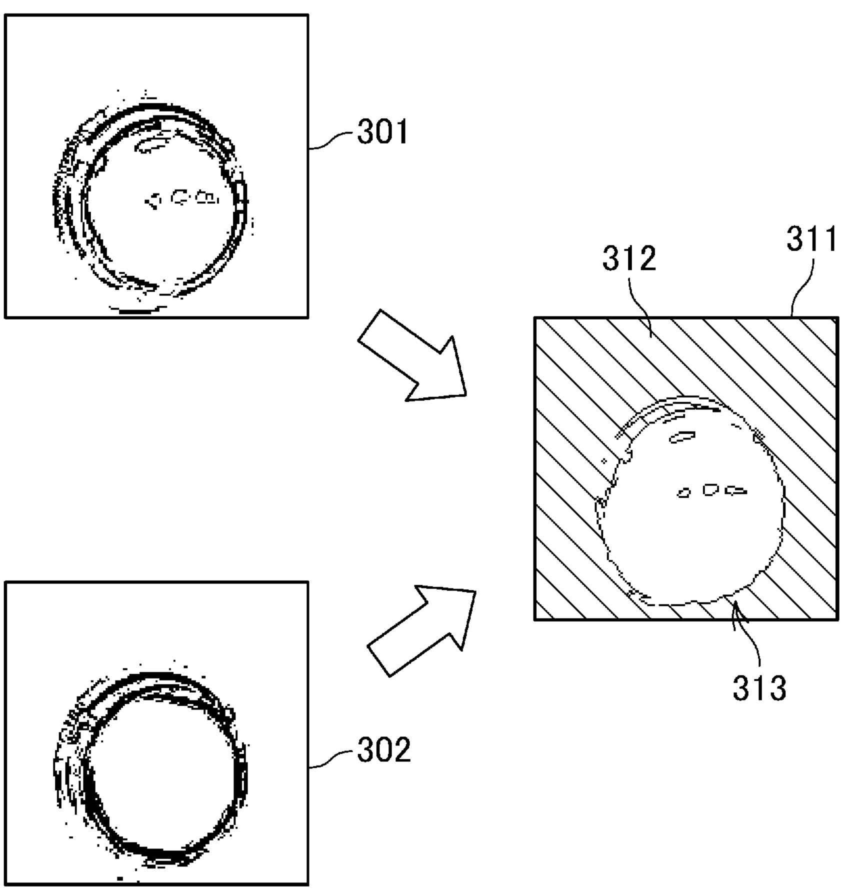
FIG. 19 is a schematic diagram illustrating mask image generation processing.

FIG. 18 is a flowchart illustrating an example of mask image generation processing to be executed by the image processing unit 211. FIG. 19 is a schematic diagram illustrating an example of mask image generation processing, and illustrates an example of processing a captured image of the display lamp 71. The "mask image generation processing" is processing of generating a mask image.

An operation illustrated in FIG. 18 is executed by the image processing unit 211, for example.

The image processing unit 211 acquires an ON image of a target portion from which a mask image is to be generated (S201). The ON image refers to a captured image captured in a state in which a lamp in the target portion is turned on. The image processing unit 211 acquires an OFF image of the target portion (S202). The OFF image refers to a captured image captured in a state in which a lamp in the target portion is turned off. The OFF image acquired in step S202 is an image obtained by capturing an image of the same target portion as the ON image acquired in step S201.

FIG. 19 illustrates an ON image 301 and an OFF image 302 captured in a case where a target portion is the display lamp 71. The ON image 301 is a captured image captured in a state in which the display lamp 71 is turned ON. Specifically, the ON image 301 is a captured image captured in a state in which the display lamp 71 is lighting. The OFF image 302 is a captured image captured in a state in which the display lamp 71 is turned OFF. Specifically, the OFF image 302 is a captured image captured in a state in which the display lamp 71 has gone out. The ON image 301 and the OFF image 302 are extracted from the target image, for example. The ON image 301 and the OFF image 302 may be images not having been subjected to image correction of correcting distortion, or may be images having been subjected to image correction.

Referring back to FIG. 18, the image processing unit 211 calculates a brightness difference between the ON image and the OFF image, for each position of the ON image and the OFF image (S203). For example, the image processing unit 211 associates a coordinate in the ON image and a coordinate in the OFF image, obtains a brightness at a first position in the ON image and a brightness at a second position in the OFF image that corresponds to the first position, and calculates a difference between the obtained brightnesses. In the processing of calculating a brightness, the image processing unit 211 may calculate an average value of brightnesses in a region having a predetermined area, or may calculate a brightness of one pixel.

The image processing unit 211 generates a mask image for masking a region in which the brightness difference calculated in step S203 is equal to or smaller than a threshold value (S204). A value of brightness is 0 to 255, for example. In this case, a threshold value of the brightness difference can be set to a value from 0 to 255.

A mask image 311 illustrated in FIG. 19 includes a mask region 312 and an unmasked region 313. The mask region 312 is a region in which a difference in brightness between the ON image 301 and the OFF image 302 is equal to or smaller than the threshold value. The unmasked region 313 is a region in the mask image 311 that is other than the mask region 312. A difference in brightness between the ON image 301 and the OFF image 302 in the unmasked region 313 is a value exceeding the threshold value, and is larger than that in the mask region 312.

In other words, a determination partial image generated by extracting an unmasked region is an image obtained by extracting a region in which a brightness prominently changes in accordance with a lighting mode of a target portion. Accordingly, by using the determination partial image, a lighting mode of the target portion can be determined more easily and accurately as compared with a case where the determination partial image is not used.

The operation illustrated in FIG. 18 is executed for each target portion. With this configuration, a mask image of each target portion is generated. The data of the generated mask image is included in the mask image data 221. The target portion is a target from which the state determination unit 113 determines a display mode or a lighting mode, and corresponds to the display lamps 51*a* to 51*d*, the display lamps 52*a* and 52*b*, the display lamps 71 and 72, or the like. The mask image data 221 can include data of mask images corresponding to all target portions targeted by the state determination unit 113 for determination.

FIG. 20 is a flowchart illustrating an example of image processing before determination that is to be executed by the image processing unit 211. The image processing before determination is processing of the image processing unit 211 generating a determination partial image before the state determination unit 113 performs determination. The image processing before determination is executed after step S12 illustrated in FIG. 8, and before step S14, for example.

In the image processing before determination, the image processing unit 211 acquires a partial image extracted from the image recognition unit 112 (S211). The image processing unit 211 selectively acquires a mask image corresponding to processing executed by the state determination unit 113 (S212). For example, in a case where the state determination unit 113 performs processing of determining a lighting mode of the display lamp 71, in step S212, the image processing unit 211 acquires data of a mask image corresponding to a partial image of the display lamp 71, from the mask image data 221. A size of the mask image selected in step S212 needs not completely match the size of the partial image acquired in step S211. For example, the image processing unit 211 may acquire, in step S212, a mask image overlapping a part of the partial image acquired in step S211.

By extracting an unmasked region from the partial image acquired in step S211, using the mask image acquired in step S212, the image processing unit 211 generates a determination partial image (S213). The determination partial image generated in step S213 is an image of a target portion on which the state determination unit 113 performs processing. The image processing unit 211 outputs the generated determination partial image in a state of being processable by the state determination unit 113 (S214).

The determination partial image generated in the processing in FIG. 20 is not limited to an image including only one target portion. For example, the image processing unit 211 may apply one mask image to a partial region of a partial image including a plurality of target portions. In this case, in step S213, an unmasked region is extracted in an image of a target portion to which the mask image is to be applied, and images of other target portions are extracted in an unprocessed state. With this configuration, a part of a plurality of target portions appearing in the partial image enters a state having been processed by the image processing unit 211.

In step S214, the image processing unit 211 may apply a plurality of mask images to one partial image acquired in step S211. For example, the image processing unit 211 may acquire a plurality of mask images in step S212, and generate a determination partial image by applying one partial image to the plurality of mask images.

In addition, the mask image may include images of a plurality of target portions.

In the second embodiment, the state determination unit 113 executes test state determination processing using a partial image generated by the image processing unit 211 (step S14). With this configuration, it becomes possible to determine a test state of the monitoring device 10*a* more accurately as compared with a case where a partial image is not used.

A mask image is generated using an ON image and an OFF image obtained by capturing images of a target portion. The ON image and the OFF image are images captured by the camera 80 in a state in which the material testing machine 20 and the monitoring device 10*a* are installed, for example. In this case, a mask image generated in mask image generation processing masks a region susceptible to an image capturing environment of the camera 80 including environmental light. By using a mask image, the image processing unit 211 can extract, as an unmasked region, a region in a captured image of the camera 80 in which a change in image is likely to appear in accordance with a lighting mode of a target portion. It is therefore possible to suppress influence of an image capturing environment related to the determination performed by the state determination unit 113, make the determination performed by the state determination unit 113, less susceptible to a change in environmental light or the like, and enable determination with high robustness. With this configuration, the accuracy of determination performed by the state determination unit 113 can be expected to be further enhanced.

The monitoring device 10*a* can apply image processing that uses a mask image, to any of the display device regions 53, 54, and 55.

In addition, a determination partial image generated in the image processing before determination illustrated in FIG. 18 may be used also in the hydraulic pressure source state determination processing in step S12. In this case, the image processing unit 211 generates a determination partial image of the display device region 53 by performing image processing of the partial image of the display device region 53 using a mask image. The state determination unit 113 executes hydraulic pressure source state determination processing using a determination partial image for the display device region 53 that has been generated by the image processing unit 211. With this configuration, a hydraulic pressure source state of the material testing machine 20 can be determined more accurately as compared with a case where a partial image is not used.

3. Third Embodiment

In the second embodiment, processing of generating a mask image based on a difference in brightness between an ON image and an OFF image in mask image generation processing has been described. The monitoring device 10*a* may perform processing of generating a mask image based on saturation and hue aside from brightness. This example will be described as a third embodiment. The configurations of the monitoring device 10*a* and the material testing machine 20 in the third embodiment are similar to those in the second embodiment.

Figure 21:
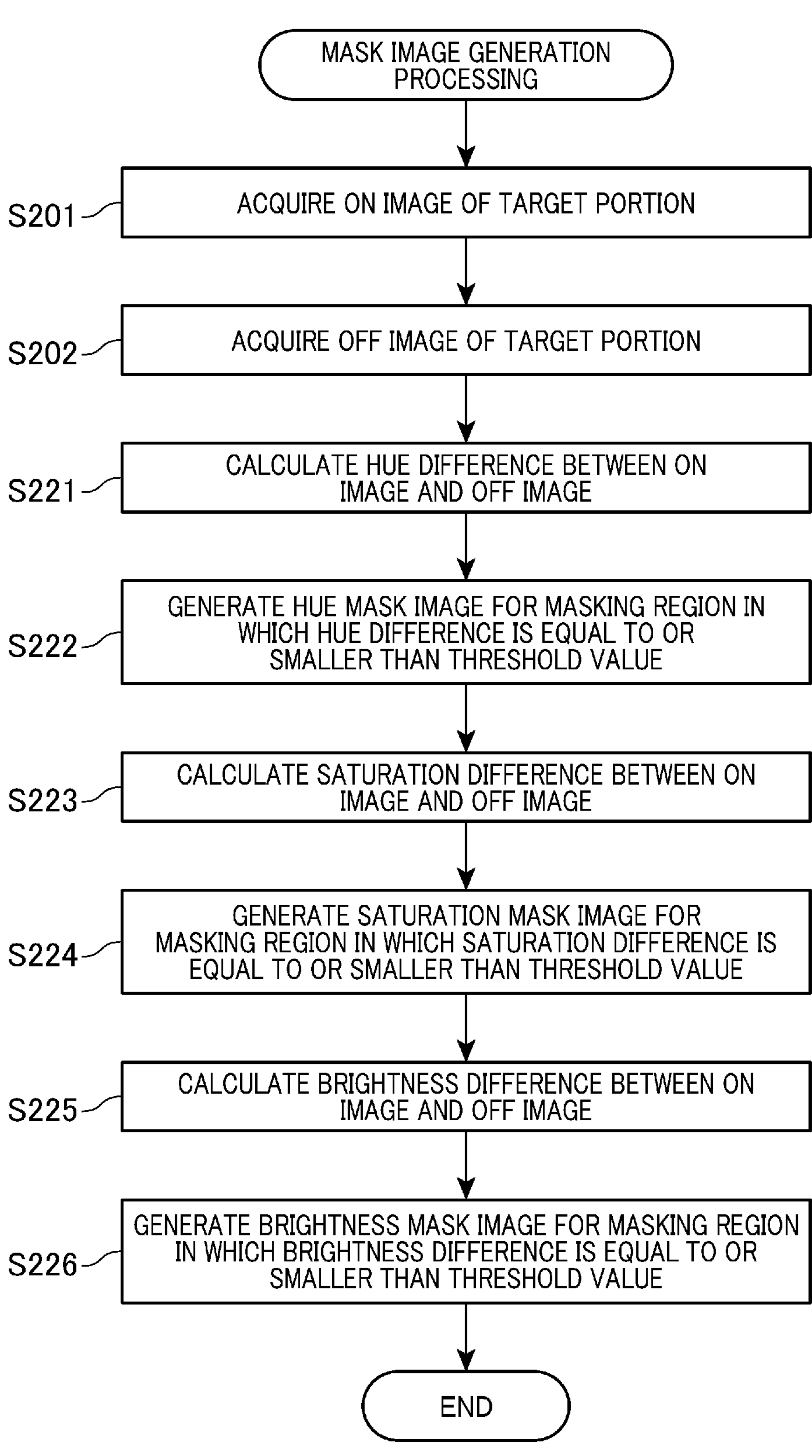
FIG. 21 is a flowchart illustrating an example of mask image generation processing according to a third embodiment.

FIG. 21 is a flowchart illustrating an example of mask image generation processing according to a third embodiment. The mask image generation processing in FIG. 21 is executed by the image processing unit 211 using a captured image of the camera 80, for example.

The operations in steps S201 and S202 are similar to the operations described with reference to FIG. 18. Subsequently to step S202, the image processing unit 211 calculates a difference in hue between an ON image and an OFF image, for each position of the ON image and the OFF image (S211). For example, the image processing unit 211 associates a coordinate in the ON image and a coordinate in the OFF image, obtains a value of hue at a first position in the ON image and a value of hue at a second position in the OFF image that corresponds to the first position, and calculates a difference between the obtained values. In the processing of calculating a value of hue, the image processing unit 211 may calculate an average value of values of hue in a region having a predetermined area, or may calculate a value of hue of one pixel.

After that, the image processing unit 211 generates a mask image for masking a region in which the hue difference calculated in step S221 is equal to or smaller than a threshold value (S222). A value of hue is 0 to 255, for example. In this case, a threshold value of the hue difference can be set to a value from 0 to 255.

In addition, the image processing unit 211 calculates a saturation difference between the ON image and the OFF image, for each position of the ON image and the OFF image (S223). For example, the image processing unit 211 associates a coordinate in the ON image and a coordinate in the OFF image, obtains a value of saturation at a first position in the ON image and a value of saturation at a second position in the OFF image that corresponds to the first position, and calculates a difference between the obtained values. In the processing of calculating a value of saturation, the image processing unit 211 may calculate an average value of values of saturation in a region having a predetermined area, or may calculate a value of saturation of one pixel. After that, the image processing unit 211 generates a mask image for masking a region in which the saturation difference calculated in step S223 is equal to or smaller than a threshold value (S224). A value of saturation is 0 to 255, for example. In this case, a threshold value of the saturation difference can be set to a value from 0 to 255.

The threshold values of brightness, saturation, and hue are defined based on captured images probatively captured in an actual installed state of the monitoring device 10*a*, or a test environment imitating the actual installed state, for example.

In addition, the image processing unit 211 calculates a brightness difference between the ON image and the OFF image, for each position of the ON image and the OFF image (S225). For example, the image processing unit 211 associates a coordinate in the ON image and a coordinate in the OFF image, obtains a value of brightness at a first position in the ON image and a value of brightness at a second position in the OFF image that corresponds to the first position, and calculates a difference between the obtained values. In the processing of calculating a value of brightness, the image processing unit 211 may calculate an average value of values of brightness in a region having a predetermined area, or may calculate a value of brightness of one pixel. After that, the image processing unit 211 generates a mask image for masking a region in which the brightness difference calculated in step S225 is equal to or smaller than a threshold value (S226).

Here, the processing in steps S221, S223, and S225 will be described.

A value of hue can be calculated by the following procedures 1 to 3, for example.

Procedure 1. R, G, and B values at the first position of the ON image are acquired. Here, the R, G, and B values refer to pixel values. Here, an example in which an ON image is a 24-bit color image, the R value is 0 to 255, the G value is 0 to 255, and the B value is 0 to 255 will be described.

Procedure 2. The maximum value and the minimum value among the R value, the G value, and the B value are identified, and the maximum value is denoted by NMAX and the minimum value is denoted by NMIN.

Procedure 3. A value of hue H is obtained. More specifically, in a case where the R value is maximum, the hue H value is obtained by the following formula (1). In a case where the G value is maximum, the hue H value is obtained by the following formula (2). In a case where the B value is maximum, the hue H value is obtained by the following formula (3). In a case where all of the R value, the G value, and the B value are the same values, H=0 is set.

$$H = 60 \times ((G - B)/(NMAX - NMIN)) \tag{1}$$

$$H = 60 \times ((B - R)/(NMAX - NMIN)) + 120 \tag{2}$$

$$H = 60 \times ((R - G)/(NMAX - NMIN)) + 240 \tag{3}$$

A value of saturation S can be calculated by the following formula (4) using NMAX and NMIN obtained in the above-described procedures 1 to 2, for example.

$$S = (NMAX - NMIN)/NMAX \tag{4}$$

A value of brightness V can be calculated by the following formula (5) using NMAX and NMIN obtained in the above-described procedures 1 to 2, for example.

$$V = NMAX \tag{5}$$

This method can also be applied to processing of calculating brightness of an ON image in the above-described second embodiment.

The image processing unit 211 calculates hue, saturation, and brightness of an ON image by the above-described procedures, and calculates hue, saturation, and brightness of an OFF image by similar procedures.

By the above-described operations, a hue mask image, a saturation mask image, and a brightness mask image are generated. The hue mask image, the saturation mask image, and the brightness mask image are included in the mask image data 221 as described in the second embodiment. The hue mask image is a mask image generated in step S222, and the saturation mask image is a mask image generated in step S224. In other words, the hue mask image is a mask image masking a region in which a hue difference is equal to or smaller than the threshold value, and the saturation mask image is a mask image masking a region in which a saturation difference is equal to or smaller than the threshold value. These mask images can be used for image recognition processing to be performed by the image recognition unit 112, hydraulic pressure source state determination processing to be performed by the state determination unit 113 (step S13), and test state determination processing (step S14). The use of these mask images brings about an effect of enhancing accuracy of processing of recognizing or determining a display mode of the display 50 or lighting modes of the display device regions 53, 54, and 55.

A target to be recognized by the image recognition unit 112, and a target to be determined by the state determination unit 113 are regarded as a target portion. The target portion is, for example, the entire display of the display 50, or the number of cycles display unit 501, the specific symbol display unit 502, or the test state display unit 503 that is displayed on the display 50. In addition, the target portion is, for example, the run button 511, the stop button 512, the manifold button 513, the load application button 514, the start key 521, the stop key 522, the display lamp 71, or the display lamp 72.

In the third embodiment, the image recognition unit 112 can execute recognition and the state determination unit 113 can execute determination based on any one or more of hue, saturation, and brightness. In a case where a captured image of the camera 80 changes in color in a case where a display mode or a lighting mode of a target portion changes, it is preferable to perform recognition or determination using hue or saturation. For example, the display lamps 51*a* to 51*d*, 52*a*, and 52*b* can have a configuration of switching between two or more lighting colors. In a case where the display lamp 51*a* switches a lighting color between a first lighting color and a second lighting color, it is easy to distinguish between the first lighting color and the second lighting color based on a hue difference or a saturation difference. In addition, for example, this is also preferable for a case where a color of an item displayed on the display 50 changes.

Then, in a case where a change in hue caused by a change in display mode or lighting mode of a target portion is small, if a saturation difference is used, recognition and determination can be performed more accurately as compared with a case where a saturation difference is not used. Specifically, a case where the first lighting color and the second lighting color are similar colors and a case where the first lighting color and the second lighting color are close colors are included. In addition, also in a case where lighting and extinction of one light source are configured to be switched in a target portion, it is preferable to perform recognition or determination using a saturation difference.

In addition, in a case where a change in hue caused by a change in display mode or lighting mode of a target portion is large, if a hue difference is used, recognition and determination can be performed more accurately as compared with a case where a hue difference is not used. Specifically, a case where the first lighting color and the second lighting color are not similar colors and a case where the first lighting color and the second lighting color are complementary colors are included.

In addition, in a case where a change in brightness caused by a change in display mode or lighting mode of a target portion is large, if a brightness difference is used, recognition and determination can be performed more accurately as compared with a case where a brightness difference is not used. Specifically, a case where lighting and extinction of a light source are configured to be switched in a target portion is included.

The image processing unit 211 executes the image processing before determination illustrated in FIG. 20, using at least any of a hue mask image, a saturation mask image, and a brightness mask image. In this case, the image processing unit 211 may select any of a hue mask image, a saturation mask image, and a brightness mask image in accordance with a target portion being a target of determination to be executed by the state determination unit 113. In this case, a mask image to be applied to each target portion may be preset from among a hue mask image, a saturation mask image, and a brightness mask image.

For example, the image processing unit 211 calculates, for an ON image and an OFF image of a target portion, an average value of hue of an unmasked region, an average value of saturation of an unmasked region, and an average value of brightness of an unmasked region. The image processing unit 211 calculates a difference in average value of hue between the ON image and the OFF image of the target portion, a difference in average value of saturation therebetween, and a difference in average value of brightness therebetween. Then, the image processing unit 211 identifies the largest difference among the difference in average value of hue, the difference in average value of saturation, and the difference in average value of brightness. In a case where the difference in average value of hue is the largest, the image processing unit 211 associates a hue mask image with the target portion. In addition, in a case where the difference in average value of saturation is the largest, the image processing unit 211 associates a saturation mask image with the target portion. In addition, in a case where the difference in average value of brightness is the largest, the image processing unit 211 associates a brightness mask image with the target portion.

In addition, the image processing unit 211 may execute image processing before determination that uses a hue mask image, image processing before determination that uses a saturation mask image, and image processing before determination that uses a brightness mask image. In this case, the state determination unit 113 selects any of a determination partial image generated using the hue mask image, a determination partial image generated using the saturation mask image, and a determination partial image generated using the brightness mask image. Using the selected determination partial image, the state determination unit 113 executes the hydraulic pressure source state determination processing in step S13 and test state determination processing in step S14.

Also in a case where a determination partial image to be used by the image recognition unit 112 is generated, the image processing unit 211 may similarly execute image processing before determination that uses a hue mask image, image processing before determination that uses a saturation mask image, and image processing before determination that uses a brightness mask image. In this case, the image recognition unit 112 selects and uses any of a determination partial image generated using the hue mask image, a determination partial image generated using the saturation mask image, and a determination partial image generated using the brightness mask image.

In this manner, according to the configuration of the third embodiment, the monitoring device 10*a* includes the mask image data 221 including a hue mask image, saturation mask image, and a brightness mask image, and the image processing unit 211 executes image processing that uses each of these mask images. With this configuration, in a case where the state determination unit 113 determines a display mode of the display 50 or lighting modes in the display device regions 53, 54, and 55, it is possible to further enhance determination accuracy and easily perform determination. Specifically, determination with high accuracy can be performed on a target portion in which any of a hue difference, a saturation difference, and a brightness difference that is caused by a change in display mode or a change in lighting mode is small. By the image processing unit 211 executing image processing that uses a hue mask image, a saturation mask image, and a brightness mask image, accuracy of processing performed by the image recognition unit 112 can also be enhanced.

In addition, because a display mode and a lighting mode can be determined based on hue, saturation, and brightness of a captured image, it is possible to suppress influence of an image capturing environment of the camera 80, and enable determination less susceptible to a change in environmental light or the like, and having high robustness.

Furthermore, in addition to a change in brightness that is caused by a change in display mode or lighting mode, determination can be performed using a hue change and a saturation change. Thus, also in a case where a display mode or a lighting mode of a target portion changes to a large number of states such as three patterns and four patterns, a display mode or a lighting mode can be accurately determined.

4. Fourth Embodiment

In the second embodiment and the third embodiment, an example in which the image processing unit 211 generates a determination partial image, and using this determination partial image, the state determination unit 113 executes the hydraulic pressure source state determination processing (step S13) and/or the test state determination processing (step S14) has been described.

As an application example of the present invention, the state determination unit 113 may use a mask image in the hydraulic pressure source state determination processing (step S13) and/or the test state determination processing (step S14). This example will be described with reference to FIG. 22.

Figure 22:
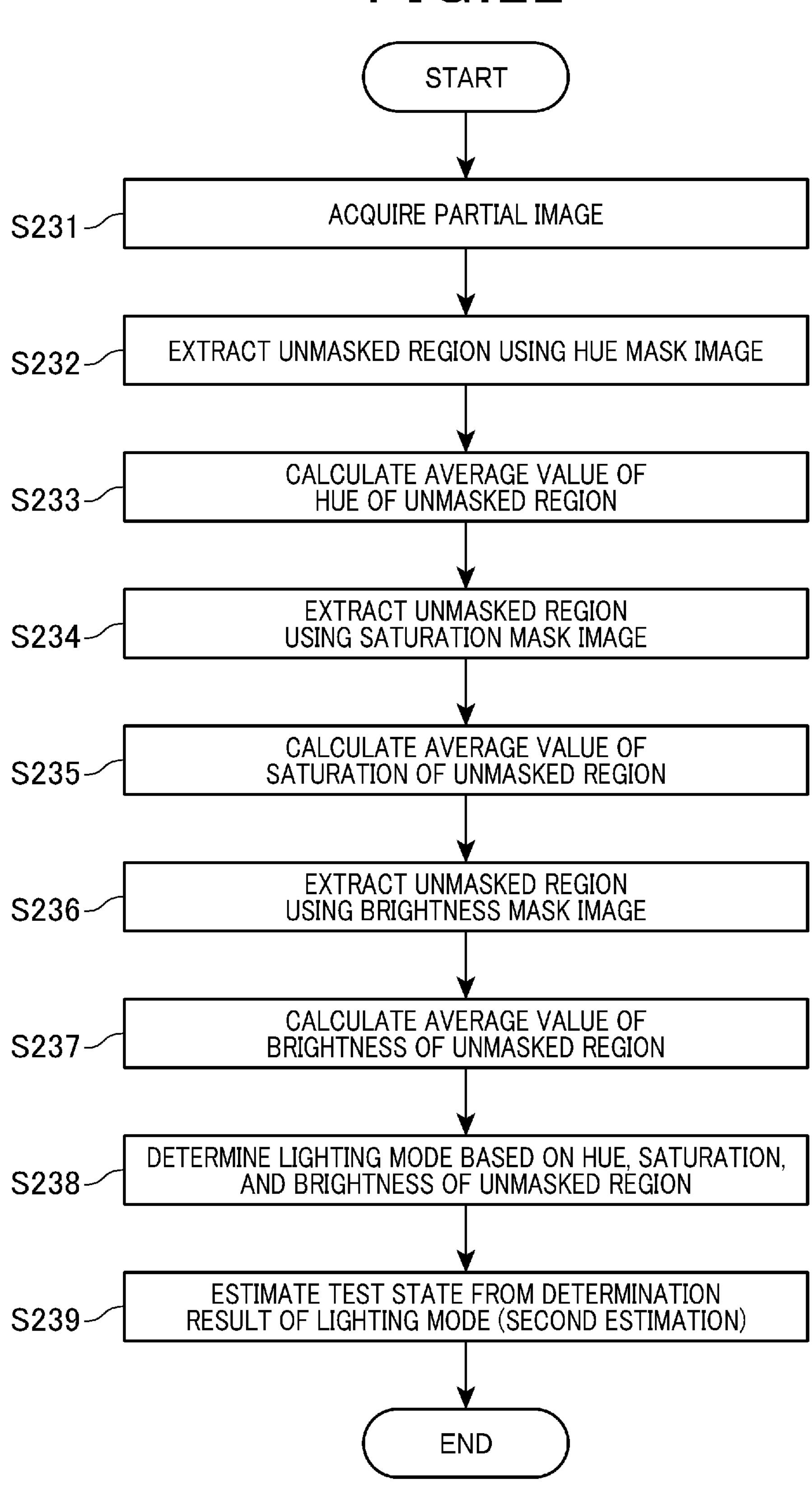
FIG. 22 is a flowchart illustrating an example of an operation of a state determination unit according to a fourth embodiment.

FIG. 22 is a flowchart illustrating an example of an operation of a state determination unit 113 according to a fourth embodiment. The operation illustrated in FIG. 22 is executed in place of step S1402 of FIG. 11.

The configurations of the material testing machine 20 and the monitoring device 10*a* in the fourth embodiment are similar to those in the third embodiment. The monitoring device 10*a* stores, into the memory 12, the mask image data 221 including a hue mask image, a saturation mask image, and a brightness mask image that are generated by the image processing unit 211 or another device.

The state determination unit 113 acquires a partial image corrected by the image recognition unit 112 (S231). The state determination unit 113 extracts an unmasked region by overlapping a hue mask image included in the mask image data 221, with the partial image (S232). The state determination unit 113 calculates an average value of hue of the unmasked region (S233).

The state determination unit 113 extracts an unmasked region by overlapping a saturation mask image included in the mask image data 221, with the partial image acquired in step S231 (S234). The state determination unit 113 calculates an average value of saturation of the unmasked region (S235).

The state determination unit 113 extracts an unmasked region by overlapping a brightness mask image included in the mask image data 221, with the partial image acquired in step S231 (S236). The state determination unit 113 calculates an average value of brightness of the unmasked region (S237).

The state determination unit 113 determines a lighting mode based on the average value of hue calculated in step S233, the average value of saturation calculated in step S235, and the average value of brightness calculated in step S237 (S238). A target of the determination in step S238 includes the display lamps 51*a* to 51*d*, 52*a*, 52*b*, and the like. The state determination unit 113 estimates a test state of the material testing machine 20 from the determination result in step S238 (S239). A result of the estimation in step S239 corresponds to second estimation.

In step S239, the state determination unit 113 determines to which of the ON image and the OFF image the average value of hue calculated in step S233 is closer, for example. More specifically, the state determination unit 113 determines to which of an average value of hue of an unmasked region in the ON image and an average value of hue of an unmasked region in the OFF image, the average value of hue of a partial image is closer. Similarly, the state determination unit 113 determines to which of the ON image and the OFF image the average value of saturation calculated in step S235 is closer, for example. Similarly, the state determination unit 113 determines to which of the ON image and the OFF image the average value of brightness calculated in step S237 is closer, for example.

The state determination unit 113 determines a lighting mode depending to which of the ON image and the OFF image the average value of hue of a partial image, the average value of saturation, and the average value of brightness are closer. For example, in a case where two or more of the average value of hue, the average value of saturation, and the average value of brightness are closer to the ON image, the state determination unit 113 determines that a target portion serving as a determination target is in the ON state. In addition, in a case where two or more of the average value of hue, the average value of saturation, and the average value of brightness are closer to the OFF image, the state determination unit 113 determines that a target portion serving as a determination target is in the OFF state.

In this determination, the state determination unit 113 may perform weighting preset to hue, saturation, and brightness.

Specifically, a determination result of hue is denoted by HD, and in a case where it is determined that the average value of hue is closer to the ON image, "HD=1" is set, and in a case where it is determined that the average value of hue is closer to the OFF image, "HD=−1" is set. In addition, a determination result of saturation is denoted by SD, and in a case where it is determined that the average value of saturation is closer to the ON image, "SD=1" is set, and in a case where it is determined that the average value of saturation is closer to the OFF image, "SD=−1" is set. In addition, a determination result of brightness is denoted by VD, and in a case where it is determined that the average value of brightness is closer to the ON image, "VD=1" is set, and in a case where it is determined that the average value of brightness is closer to the OFF image, "VD=−1" is set.

Here, a value of weighting corresponding to hue is denoted by WH, a value of weighting corresponding to saturation is denoted by WS, and a value of weighting corresponding to brightness is denoted by WV. The state determination unit 113 calculates a determined value DD by the following formula (6).

$$DD = WH \times HD + WS \times SD + WV \times VD \tag{6}$$

In a case where the calculated DD value is a value equal to or larger than 0, the state determination unit 113 determines that a lighting mode is the ON state, and in a case where the DD value is a negative value, determines that a lighting mode is the OFF state.

As described in the fourth embodiment, by performing determination using a mask image, the state determination unit 113 can determine a test state of the material testing machine 20 more accurately as compared with a case where a mask image is not used.

The operation in FIG. 22 is an example, and the state determination unit 113 may perform determination that uses a mask image, in step S131 of the hydraulic pressure source state determination processing (FIG. 10), for example. In addition, the operation illustrated in FIG. 22 may be executed only by the state determination unit 113, or at least part of the processing may be executed using the mask image data 221.

5. Aspect and Effect

Those skilled in the art understand that the above-described first to fourth embodiments are specific examples of the following aspects.

(First Clause)

A monitoring device of an analyzer according to an aspect includes an acquisition unit configured to acquire a captured image of a display panel of a control device configured to control an analyzer, an image storage unit configured to store the captured image, and a state determination unit configured to determine a state of the analyzer based on the captured image.

According to the monitoring device according to the first clause, the state determination unit determines a state of the analyzer based on a captured image of the display panel of the control device configured to control the analyzer.

The user can therefore easily recognize the state of the analyzer based on data indicating a result of the determination.

(Second Clause)

In the monitoring device according to the first clause, the display panel includes a plurality of display lamps as display devices, and the state determination unit determines a state of the analyzer that is indicated by a combination of lighting modes of the plurality of display lamps, based on a first captured image that is included in the captured image and corresponds to the plurality of display lamps.

According to the monitoring device according to the second clause, from images of display lamps included on the display panel, the state determination unit determines a state of the analyzer that is indicated by a combination of lighting modes of these display lamps.

The user therefore needs not determine a state of an analyzer that is indicated by the combination of lighting modes, by itself. Accordingly, the convenience of the user can be improved.

(Third Clause)

In the monitoring device according to the second clause, an image processing unit configured to determine a first region in the first captured image, and a second region having a larger change in an image than the first region that is caused in a case where a lighting mode of the display lamp changes, and generate a determination image including an image of the second region is included, and the state determination unit acquires the determination image as the first captured image.

According to the monitoring device according to the third clause, by using a determination image including a region in which a change in an image that is caused in a case where a lighting mode of a display lamp changes is large, determination can be performed more accurately.

(Fourth Clause)

In the monitoring device according to the third clause, the image processing unit generates the determination image by applying a mask image for masking the first region, to the first captured image.

According to the monitoring device according to the fourth clause, a determination image including a region in which a change in an image that is caused in a case where a lighting mode of a display lamp changes is large can be easily generated.

(Fifth Clause)

In the monitoring device according to the second or the third clause, a state recognition model obtained by learning, by machine learning, a relationship between the first captured image with various lighting modes of the plurality of display lamps and a state of the analyzer is included, and the state determination unit determines a state of the analyzer by inputting the first captured image to the state recognition model.

According to the monitoring device according to the fifth clause, the state determination unit determines a state of the analyzer using the state recognition model obtained by learning, by machine learning, a relationship between a combination of various lighting modes of the plurality of display lamps and a state of the analyzer.

Thus, because there is no need to individually recognize a lighting mode of each display lamp, a state of the analyzer can be promptly determined.

(Sixth Clause)

In the monitoring device according to the fifth clause, when the state determination unit determines a state of the analyzer using the state recognition model, the state determination unit adds warning information corresponding to an accuracy of the determination, to a determination result of the state.

According to the monitoring device according to the sixth clause, when the state determination unit determines a state of the analyzer using the state recognition model, the state determination unit adds warning information corresponding to a determination accuracy thereof, to a determination result.

With this configuration, the user can easily recognize the level of reliability of the determination result from warning information added to the determination result.

(Seventh Clause)

In the monitoring device according to any one of the second to sixth clauses, an image recognition unit configured to perform image recognition processing on the captured image is included, at at least two corners of each of display device regions being regions in which the display devices are provided, markers to which barcodes indicating an identification code of the display device region are allocated are arranged on the display panel, the image recognition unit acquires the identification code from captured images of the markers included in the captured image, and the image recognition unit identifies image regions in the captured image that correspond to the respective display device regions, based on positions of the markers and the identification code.

According to the monitoring device according to the seventh clause, the image recognition unit acquires the identification code from images of the markers arranged on the display panel, and identifies an image region in which a display device is arranged, based on positions of the markers on the captured image and the above-described identification code.

Thus, even in a case where a position of a camera is moved during a test, the image region in which the display device is arranged on the captured image can be easily identified from the positions of the markers, and processing of state determination can be promptly performed.

(Eighth Clause)

In the monitoring device according to the seventh clause, on the display panel, at least one of the display device regions is rectangular, and the markers are arranged at four corners of the at least one rectangular display device region, and the image recognition unit corrects distortion of an image in the image region based on positions of the markers arranged at the four corners of the rectangular display device region.

According to the monitoring device according to the eighth clause, the image recognition unit corrects distortion of the image based on the positions of the markers arranged at the four corners of the rectangular display device region in which the display device is arranged.

Thus, even in a case where a position of a camera is moved during a test, and a state of image distortion changes, image distortion can be appropriately recognized from the arrangement of markers, and image correction can be promptly performed.

(Ninth Clause)

In the monitoring device according to the seventh or the eighth clause, at least one of the display devices is a numerical display device displaying a specific symbol and a numerical value, the image recognition unit estimates a character size of the numerical value displayed on the numerical display device, based on a size of the symbol displayed on the numerical display device, and the image recognition unit generates numerical data to be displayed on the numerical display device, by image recognition processing that uses the estimated character size.

According to the monitoring device according to the ninth clause, the image recognition unit estimates a character size of the displayed numerical value from a size of the specific symbol displayed on the numerical display device, and generates numerical data by recognizing the displayed numerical value using the estimated character size.

With this configuration, it is possible to reduce a possibility that a displayed numerical value is erroneously recognized by character recognition that uses an inappropriate character size, and incorrect numerical data is generated.

(Tenth Clause)

In the monitoring device according to the ninth clause, the analyzer executes a fatigue test, a numerical value to be displayed by the numerical display device includes the number of cycles of the fatigue test, the acquisition unit acquires a plurality of the captured images captured at a predetermined time interval in the fatigue test, the image recognition unit generates the numerical data indicating a value of the number of cycles, from each of the plurality of captured images, the monitoring device includes an update unit configured to update a number of cycles determined value being a value of the number of cycles to be associated with the captured image, based on the numerical data of the number of cycles generated by the image recognition unit, the update unit obtains a regression line, with respect to a time, of the numerical data of the number of cycles generated from each of at least three of the captured images captured before a target image being one of the plurality of captured images, and in a case where an amount of difference from the regression line of a target value being a value of the numerical data of the number of cycles generated from the target image is equal to or smaller than a predetermined value, the update unit updates the number of cycles determined value with the target value.

According to the monitoring device according to the tenth clause, in a case where an amount of difference between a regression line, with respect to a time, of a value of the number of cycles generated from captured images captured before the target image, and a numerical value (target value) of the number of cycles generated from the target image is equal to or smaller than a predetermined value, the update unit updates the number of cycles determined value to be associated with the target image, with the target value.

It is therefore possible to associate, with a captured image, a number of cycles determined value with high reliability that considers a time change inclination of the number of cycles that is indicated by the regression line.

(Eleventh Clause)

In the monitoring device according to the tenth clause, in a case where an amount of difference from the regression line of the target value is not equal to or smaller than a predetermined value, when all of the numerical data of the number of cycles generated from a predetermined number of the captured images captured before the target image are same values, the update unit updates the number of cycles determined value with the same value, and updates the regression line.

According to the monitoring device according to the eleventh clause, when an amount of difference between the target value and the regression line is not equal to or smaller than the predetermined value, and all of the numerical data of the number of cycles generated from a predetermined number of the preceding captured images are same values, the update unit updates a number of cycles determined value with the same value, and updates the regression line.

Thus, for example, even in a case where a stress application cycle of a fatigue test is changed, and a time change inclination of the number of cycles changes, it is possible to prevent an incorrect number of cycles determined value from being associated with a captured image, and thereafter recognize a new time change inclination of the number of cycles using the updated regression line, and associate a number of cycles determined value with high reliability, with a captured image.

(Twelfth Clause)

In the monitoring device according to the tenth or eleventh clause, in a case where an amount of difference from the regression line of the target value is not equal to or smaller than a predetermined value, when at least one of the numerical data of the number of cycles generated from a predetermined number of the captured images captured before the target image is a value different from other values, the update unit does not update the number of cycles determined value.

According to the monitoring device according to the twelfth clause, when an amount of difference from the regression line of the target value is not equal to or smaller than the predetermined value, and at least one of the numerical data of the number of cycles generated from a predetermined number of the preceding captured images is a value different from other values, the update unit does not update the number of cycles determined value.

Thus, in a case where an inappropriate change occurs in numerical data of the number of cycles in a period in which a time change of the number of cycles does not occur, it is possible to maintain a number of cycles determined value at the latest value, and an error of the number of cycles determined value can be suppressed to be small.

(Thirteenth Clause)

In the monitoring device according to the twelfth clause, when the update unit does not update the number of cycles determined value, the update unit adds warning information to the number of cycles determined value.

In the monitoring device according to the thirteenth clause, when the update unit does not update the number of cycles determined value, the update unit adds warning information to the number of cycles determined value.

From the warning information added to the number of cycles determined value, the user can therefore easily recognize that the reliability of the number of cycles determined value might be low.

6. Other Embodiments

Note that the monitoring devices 10 and 10*a* and the material testing machine 20 according to the above-described first to fourth embodiments are mere examples of aspects of the material testing machine according to the present invention, and modifications and applications can be arbitrarily made without departing from the gist of the present invention.

For example, in each of the above-described embodiments, the material testing machine 20 is assumed to be a fatigue tester, for example, but the material testing machine 20 is not limited to a fatigue tester. The material testing machine 20 can be an arbitrary testing machine that performs a material test by adding test force to the test piece SP and deforming the test piece SP. For example, the material testing machine 20 may be a tensile testing machine, a compression testing machine, a bend testing machine, or a torsion testing machine.

In addition, each functional unit illustrated in FIG. 5 indicates a functional configuration, and a specific implementation configuration is not specifically limited. That is, hardware corresponding to each functional unit needs not be always mounted, and a configuration in which one processor implements functions of a plurality of functional units by executing programs can also be of course employed. In addition, a part of functions implemented by software in the above-described embodiment may be implemented by hardware, or a part of functions implemented by hardware may be implemented by software. The same applies to FIG. 17.

In addition, processing unit of the flowcharts illustrated in FIGS. 8 to 14, 18, 20, 21, and 22 are divided in accordance with main processing content for facilitating the understanding of processing in the monitoring device 10. A way of dividing the processing units of the flowcharts illustrated in FIGS. 8 to 14, 18, 20, 21, and 22 is not limited by a name, and the processing units can be divided into a further larger number of processing units in accordance with processing content, or the processing units can be divided in such a manner that one processing unit can include a larger number processes. In addition, processing orders of the above-described flowcharts are not limited to the examples illustrated in the drawings.

In addition, the monitoring program 121 to be executed by the processor 11 of the monitoring device 10 or 10*a* can also be recorded onto a recording medium in a computer-readable manner. As a recording medium, a magnetic or an optical recording medium or a semiconductor memory device can be used. Specifically, a portable or fixed recording medium such as a flexible disc, a hard disc drive (HDD), a compact disk read only memory (CD-ROM), a digital versatile disk (DVD), or Blu-ray (registered trademark) disc, a magnet-optical disk, a flash memory, or a card-type recording medium is included. In addition, the recording medium may be a nonvolatile storage device such as a RAM, a ROM, or an HDD being an internal storage device included in the monitoring device 10. In addition, the monitoring program 121 may be stored into a server device or the like, and the monitoring program 121 may be downloaded from the server device into the memory 12 of the monitoring device 10.

REFERENCE SIGNS LIST

10, 10*a* Monitoring device
11 Processor
111 Acquisition unit
112 Image recognition unit
113 State determination unit
114 Update unit
115 Output unit
12 Memory
121 Monitoring program
122 Image data
123*a* Hydraulic pressure state recognition model
123*b* Test state recognition model
124 Determination result data
125 Numerical data
211 Image processing unit
221 Mask image data
13 Input unit
14 Display unit
141 Data display screen
142 Target image display unit
143, 144, 145 Partial image display unit
146 Determination result display unit
147 Numerical display unit
15 Device connection interface
16 Communication interface
20 Material testing machine (analyzer)
21 Base
22*a*, 22*b* Support
23 Yoke
24 Crosshead
25 Hydraulic actuator
25*a* Piston rod
26*a* Lower jig
26*b* Upper jig
27 Load cell
28 Servo valve
29 Operating transformer
30 Hydraulic pressure source
30*a* Hydraulic pump

30*b* Manifold
30*c* Piping valve
30*d* Load valve
40 Control device
41 Display panel
410 Power switch
411 Function key
412 Dial
413 Setting key
414 Numerical keypad
415 Emergency stop switch
50 Display
501 Number of cycles display unit
502 Specific symbol display unit
503 Test state display unit
51 Power unit operation key
51*a*, 51*b*, 51*c*, 51*d* Display lamp
511 Run button
512 Stop button
513 Manifold button
514 Load application button
52 Test operation key
52*a*, 52*b* Display lamp
521 Start key
522 Stop key
53, 54, 55 Display device region
531, 532, 533, 534, 541, 542, 551, 552 Marker
60 Data display screen
61 Determination result display unit
62 Numerical display unit
63 Target image display unit
64 Whole image display unit
65 Test piece image display unit
70 Display panel
71, 72 Display lamp
73 Reset button
74 Emergency stop switch
751, 752, 753, 754 Marker
80 Camera
81 Tripod
SP Test piece

What is claimed is:

1. A monitoring device of an analyzer executing a fatigue test comprising:
- a processor configured to acquire a captured image of a display panel of a control device configured to control the analyzer executing the fatigue test, and
- a memory that stores the captured image,
- wherein
- the processor is configured to perform image recognition processing on the captured image,
  - the display panel comprises a plurality of display devices, at least one of the display devices is a numerical display device, and a numerical value to be displayed by the numerical display device includes a number of cycles of the fatigue test, and
- the processor is configured to:
- acquire a plurality of the captured images captured at a predetermined time interval in the fatigue test,
  - generate a numerical data indicating a value of the number of cycles from the captured image,
  - update a determined value being a value of the number of cycles to be associated with the captured image, based on the numerical data of the number of cycles generated,
  - obtains a regression line, with respect to a time, of the numerical data of the number of cycles generated from each of at least three of the captured images captured before a target image being one of the plurality of captured images, and
  - in a case where an amount of difference from the regression line of a target value being a value of the numerical data of the number of cycles generated from the target image is equal to or smaller than a predetermined value, updates the determined value with the target value.

2. The monitoring device of an analyzer according to claim 1, wherein the plurality of display devices comprises a plurality of display lamps, and the processor determines a state of the analyzer that is indicated by a combination of lighting modes of the plurality of display lamps, based on a first captured image that is included in the captured image and corresponds to the plurality of display lamps.

3. The monitoring device of an analyzer according to claim 2, wherein the processor is configured to determine a first region in the first captured image, and a second region having a larger change in an image than the first region that is caused in a case where a lighting mode of the display lamp changes, and generate a determination image including an image of the second region, and
- the processor is configured to acquire the determination image as the first captured image.

4. The monitoring device of an analyzer according to claim 3, wherein the processor generates the determination image by applying a mask image for masking the first region, to the first captured image.

5. The monitoring device of an analyzer according to claim 2 or 3, comprising a state recognition model obtained by learning, by machine learning, a relationship between the first captured image with various lighting modes of the plurality of display lamps and a state of the analyzer,
- wherein the processor determines a state of the analyzer by inputting the first captured image to the state recognition model.

6. The monitoring device of an analyzer according to claim 5, wherein, when the processor determines a state of the analyzer using the state recognition model, the processor adds warning information corresponding to an accuracy of the determination, to a determination result of the state.

7. The monitoring device of an analyzer according to claim 2 or 3,
- wherein, at at least two corners of each of display device regions being regions in which the display devices are provided, markers to which barcodes indicating an identification code of the display device region are allocated are arranged on the display panel,
- the processor acquires the identification code from captured images of the markers included in the captured image, and
- the processor identifies image regions in the captured image that correspond to the respective display device regions, based on positions of the markers and the identification code.

8. The monitoring device of an analyzer according to claim 7,
- wherein, on the display panel, at least one of the display device regions is rectangular, and the markers are arranged at four corners of the at least one rectangular display device region, and
- the processor corrects distortion of an image in the image region based on positions of the markers arranged at the four corners of the rectangular display device region.

9. The monitoring device of an analyzer according to claim 7, wherein the numerical display device displays a specific symbol and a numerical value, the processor estimates a character size of the numerical value displayed on the numerical display device, based on a size of the symbol displayed on the numerical display device, and the processor generates numerical data to be displayed on the numerical display device, by image recognition processing that uses the estimated character size.

10. The monitoring device of an analyzer according to claim 1, wherein, in a case where an amount of difference from the regression line of the target value is not equal to or smaller than a predetermined value, when all of the numerical data of the number of cycles generated from a predetermined number of the captured images captured before the target image are same values, the processor updates the determined value with the same value, and updates the regression line.

11. The monitoring device of an analyzer according to claim 1, wherein, in a case where an amount of difference from the regression line of the target value is not equal to or smaller than a predetermined value, when at least one of the numerical data of the number of cycles generated from a predetermined number of the captured images captured before the target image is a value different from other values, the processor does not update the determined value.

12. The monitoring device of an analyzer according to claim 11, wherein, when processor does not update the determined value, the update unit adds warning information to the number of cycles determined value.

* * * * *